United States Patent [19]
Arrington et al.

[11] Patent Number: 5,610,709
[45] Date of Patent: Mar. 11, 1997

[54] AUTOMATIC RANGING OPTICAL POWER MONITORING SYSTEM

[75] Inventors: Lee O. Arrington, Hilton; Chris J. Burak, Rochester, both of N.Y.

[73] Assignee: Eastman Kodak Company, Rochester, N.Y.

[21] Appl. No.: 595,709

[22] Filed: Feb. 2, 1996

[51] Int. Cl.$^6$ .................................................. G01J 1/42
[52] U.S. Cl. ........................... 356/218; 356/224; 356/228
[58] Field of Search .................................. 356/218, 224, 356/228; 250/214 AG

[56] References Cited

U.S. PATENT DOCUMENTS

| | | | |
|---|---|---|---|
| 3,687,558 | 8/1972 | Rex | 356/218 |
| 3,818,198 | 6/1974 | Walker et al. | 356/223 |
| 3,898,583 | 8/1975 | Shuey | 331/94.5 |
| 4,306,807 | 12/1981 | Sakane et al. | 356/218 |
| 4,698,817 | 10/1987 | Burley | 372/31 |
| 4,763,334 | 8/1988 | Shimada et al. | 372/29 |
| 4,780,607 | 10/1988 | Blaszuk | 250/216 |
| 4,877,311 | 10/1989 | Shernoff | 356/350 |
| 4,903,276 | 5/1990 | Ross | 372/82 |
| 5,033,061 | 7/1991 | Hobart et al. | 372/107 |
| 5,040,163 | 8/1991 | Sasaki et al. | 369/116 |
| 5,067,117 | 11/1991 | Shimizu et al. | 369/116 |
| 5,097,473 | 3/1992 | Taguchi | 372/38 |
| 5,115,207 | 5/1992 | Fry | 330/284 |
| 5,140,601 | 8/1992 | Shimada et al. | 372/29 |
| 5,184,189 | 2/1993 | Hawsey et al. | 356/218 |
| 5,247,167 | 9/1993 | Bargerhuff et al. | 250/208.1 |
| 5,264,911 | 11/1993 | Nakane et al. | 356/218 |
| 5,267,071 | 11/1993 | Little et al. | 359/154 |
| 5,268,914 | 12/1993 | Yamamuro et al. | 372/31 |
| 5,276,697 | 1/1994 | Davis | 372/38 |
| 5,303,249 | 4/1994 | Weimel | 372/33 |
| 5,319,656 | 6/1994 | Geller | 372/38 |
| 5,327,210 | 7/1994 | Okui et al. | 356/218 |
| 5,347,503 | 9/1994 | Koyama et al. | 369/44.32 |
| 5,548,398 | 8/1996 | Gaboury | 356/218 |

*Primary Examiner*—Georgia Y. Epps
*Assistant Examiner*—Reginald A. Ratliff
*Attorney, Agent, or Firm*—Clyde E. Bailey, Sr.

[57] ABSTRACT

A high speed, automatic calibration system of laser (or other light source) sensitometers capable of a wide range of power measurements, of densitometers and of other optical power measuring systems, and particularly to an automatic gain scaling circuit for use in the same. The system measures optical power incident on a photodiode detector in the course of calibrating or using a sensitometer and automatically and rapidly selects the appropriate gain for the operational amplifier. An automatic gain scaling function performed in gain scale logic rapidly selects the proper gain of a transimpedance operation amplifier operating as a current to voltage converter and delivers an analog voltage signal within a range between an upper limit and a lower limit. An over range error signal is generated in response to an upper out of limit signal generated at the minimum gain set by said gain scale logic. A low resolution error signal is generated in response to a lower out of limit signal generated at the maximum gain set by the gain scale logic.

21 Claims, 19 Drawing Sheets

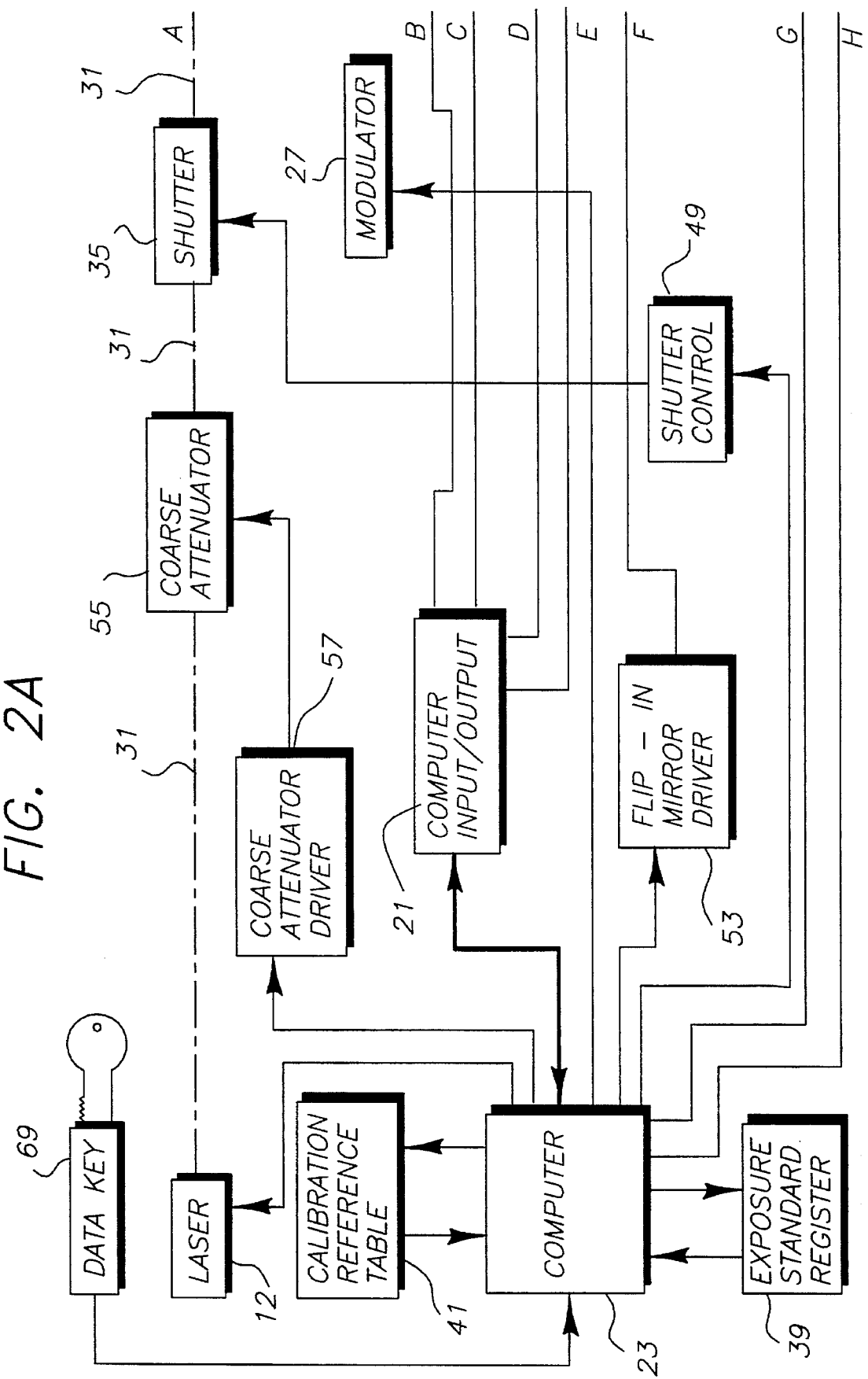

| ENERGIZED RELAY STATE | DE-ENERGIZED RELAY STATE | FEEDBACK RESISTANCE |
|---|---|---|
| K6, K5, K4, K3, K2, K1 | — | 504.000 ohms |
| K5, K4, K3, K2, K1 | K6 | 5,040.000 ohms |
| K4, K3, K2, K1 | K6, K5 | 50,400.000 ohms |
| K3, K2, K1 | K6, K5, K4 | 504,000.000 ohms |
| K2, K1 | K6, K5, K4, K3 | 5,040,000.00 ohms |
| K1 | K6, K5, K4, K3, K2 | 50,400,000.0 ohms |
| — | K6, K5, K4, K3, K2, K1 | 504,000,000. ohms |

FIG. 12

AUTOMATIC RANGING OPTICAL POWER MONITORING SYSTEM

FIELD OF THE INVENTION

This invention relates to the high speed, automatic calibration of laser (or other light source) sensitometers capable of a wide range of power measurements, of densitometers and of other optical power measuring systems, and particularly to an automatic "gain scaling" circuit for use in the same.

BACKGROUND OF THE INVENTION

Sensitometers are employed in the manufacture of photosensitive media, e.g. photographic and radiographic film and paper, for process control to ensure product uniformity. A sensitometer is employed to expose test samples of the photosensitive product in production to a successive series of controlled optical power levels (optical power output over time) in ascending or descending order which result in a "step wedge" exposure of the test sample of the type depicted in FIG. 1. The appearance of the step wedge W on the product sample after developing is a progression of gray scale exposure steps or bands 1–20 ranging from a "black" level at one end band, arbitrarily designated "1" in FIG. 1, to a "white" level at the other end band, arbitrarily designated "20" in FIG. 1. Typical exemplary density values are shown numerically alongside the step wedge bands 1–20, although they are not exposed with the step wedge W. The "grayness" of each band may not be distinguishable by the naked eye, but can be can be determined and compared to a standard for the product type by using a densitometer. If a measurable deviation is found in any or all of the bands, then an appropriate change in the production can be undertaken to correct the photosensitivity of the product. In large scale production of such photosensitive product, it is necessary to successively expose step wedges of the type depicted in FIG. 1 on samples drawn from every few thousand square feet of product and complete the densitometry comparison to maintain process accuracy and meet product quality standards. This schedule requires fairly continuous sample extraction, exposure, processing and densitometry analysis of step wedges during production runs.

The exposure of the step wedge W of the photosensitive product sample is effected using an optical energy source consistent in wavelength sensitivity with that of the product. For example, typical color photographic negative film is sensitive to 2800 to 4000 color temperature wavelengths provided by a tungsten lamp, graphic arts, whereas "Pagiset", film or paper product is sensitive to infrared wavelengths provided by a solid state laser diode, and some medical radiographic film product is sensitive to visible laser light. For example, a He—Ne gas laser emitting light at 632.8 nm may be used in conjunction with a optical power setting system to successively make the exposures of each step wedge band at successively changed (increased or decreased) power levels to expose a step wedge on a sample of "Pagiset" graphic arts product.

FIGS. 2A and 2B, described in greater detail below, illustrates an earlier system for making the exposure of the test step wedge of FIG. 1, for example. The sample 25 is mounted to a sample transport drum 43 which is rotated by transport control 47 to incrementally advance the sample 25 in the advance direction A of FIG. 1. A laser beam 31 is successively swept by rotation of a polygon mirror 33 in successive line sweeps over the band 1–20 being exposed. Successive lines of each band are thereby exposed as the product sample 25 is incrementally advanced in the advance direction A until the band is fully exposed.

Then, it is necessary to change the laser beam power level to the next step transition. Typically, an acousto-optic modulator (AOM) 27 is employed in the laser beam between the laser 12 and the mirror 33 and product sample 25 to modulate the intensity of the beam 31 exposing each band 1–20 as a function of a step change drive signal provided by a computer 23 from a set of calibrated exposure power values for the particular photosensitive product stored in a standard exposure register 39. The AOM 27 is capable of a high resolution of beam optical power in response to a drive signal, but its response is temperature dependent.

When the AOM 27 is fully OFF, it passes the laser light beam entering it in a direction (not shown) away from the mirror 33 and product sample 25. When the AOM 27 is operated fully ON, it deflects the full intensity laser light beam into the path of light beam 31 and to the polygon mirror 33 (or diverted light beam 31' when flip-in mirror 36 is present). The AOM 27 operates in response to step change drive voltage signals (AOM drive codes) increasing between fully OFF and fully ON by deflecting progressively greater amounts of light in light beam 31 toward the flip-in mirror 33 (or in diverted light beam 31') and lesser amounts of light in the other direction.

The step wedge W of FIG. 1 is preferably composed of twenty bands or steps which are exposed with a 3 Log10 optical power range having a 2 visual density range, resulting in a 0.15 Log10 optical power/step change. As may be inferred from the difficulty in perceiving the density gradations of all of the bands 1–20 of the step wedge W of FIG. 1, single product use, laser sensitometers must be capable of emitted optical power gradations of five to six decades (100,000:1 to 1,000,000:1) of optical power. The accuracy of the sensitometry exposures of the product sample 25 is dependent on the ability to reproducibly provide this wide range of optical power day in and day out. Deviations in the step output power of the laser beam 31 can occur over time due to a number of factors and change the exposure densities in the step wedge bands. If the changes are not detected, the step wedge W used to judge product quality and control the manufacturing process of the product under test will be misinterpreted, leading to inappropriate changes in the manufacturing process and deterioration in product quality. Therefore, it is necessary to calibrate the sensitometer periodically.

In the calibration of the sensitometer, optical power measurements with a minimum resolution of three (one part in 1,000) to six (one part in 1,000,000) significant digits and coverage of five to six decades (100,000:1 to 1,000,000:1) of optical power must be possible. In the sensitometer of FIGS. 2A and 2B, time consuming gain (scale) changes are required to allow the sensitometer electronics to cover that range.

As described below in reference to FIGS. 2A and 2B, because of the time required to fully calibrate the sensitometer in all twenty step wedge optical power levels for each product type, only a limited three step check is typically made prior to each step wedge exposure. If the limited check determines that the sensitometer requires calibration, then a time consuming full calibration is necessary. Collecting optical power measurements of the laser beam during the full calibration has been accomplished using a United Detector Technology model QED-200 quantum efficiency photodiode detector connected to a current-to-voltage converter (CVC) consisting of an operational amplifier and selected feedback resistors. The voltage gain range within the CVC is selected by a computer. Output voltage from the CVC feeds a Keithly Model 617 digital voltmeter (DVM) which auto-ranges to read the output voltage with the best resolution. If the readings taken by the computer from the DVM are outside of the computer analog-to-digital (ADC) conversion range limits, the computer changes the gain of the CVC and initiates another read.

The CVC is also required to drive the output signal 20 feet to the DVM location (within photodiode and power monitoring circuit 10). The use of a current meter in place of a CVC and DVM would involve measuring currents at the fraction of a nanoampere level, well below the resolution limit of even the most precise D'arsonval movement ammeter which are usually accurate to only within a few percent of full scale, with full scale being 1 to 100 microamperes. By comparison, the CVC output voltage is in the range of 0.017 V to 6.0 V, easily measured on a digital voltmeter with substantially less noise sensitivity.

However, there are still several other problems with the above approach. The conversion rate of the DVM is dependent upon the input voltage, the allowed maximum rate decreasing with decreasing voltage level. Because the conversion rate of the DVM is low, each data point consumes up to 750 milliseconds within the DVM at the low end of the voltage range, yielding a sample rate of 1.3 data points per second. The highest DVM conversion rate is 2.9 data points per second at an input voltage of 6.0 V. The relatively low DVM conversion rates adversely impact equipment calibration time.

When a gain change of the CVC is required, the computer reads the CVC output once, changes gain, and then reads the CVC output again. These steps, including DVM latency at low input voltages, can take up to two seconds for one data point reading. Repetition of these readings is necessary in general to eliminate common mode noise due in part to the low input voltage requirement (0.017 volt minimum) to obtain the resolution on the low end of the scales, increasing a single point measurement time to three or four seconds.

PROBLEMS TO BE SOLVED BY THE INVENTION

The long time for conversion causes the sensitometer calibration process to require twenty to thirty minutes to complete a typical twenty band step wedge. Long calibration times result in heating of the AOM responsible for producing the step changes in laser power output. The heating causes the AOM to alter its optical power modulation in response to an applied step change drive signal and introduce calibration errors which increase between the initial and final step calibration. When the AOM returns to ambient temperature, an offset between the calibrated laser optical power and the actual optical power delivered from the AOM occurs, rendering the calibration inaccurate. The resulting exposures of certain or all of the steps of a step wedge may be inaccurate, resulting in an inaccurate assessment of the photosensitive response of the sampled product.

SUMMARY OF THE INVENTION

It is therefore a primary object of the invention to solve the above stated problems in the calibration of laser sensitometers by decreasing the calibration time required while increasing the low limit voltage, thereby increasing the signal-to-noise ratio and resolution.

It is a further object of the invention to eliminate the need for multiple readings per data point in the calibration of laser sensitometers and thereby decrease the calibration time needed.

It is a still further object of the invention to provide a speed improvement in data readings taken per second during calibration of a sensitometer, enhance the signal-to-noise ratio, operate independently of the system computer to reduce computer overhead, and attain a wide operating optical power range.

These and other objects of the invention are realized in a gain control system providing a gain scaling function to a current-to-voltage converter responsive to an input current signal for providing an output voltage signal within analog-to-digital conversion upper and lower limits to an analog-to-digital converter for digitizing said output voltage signal comprising: operational amplifier means having a current input terminal and an analog voltage output terminal and an adjustable resistance feedback network coupled between said current input terminal and said analog voltage output terminal for defining a plurality of gain scales between a maximum gain and a minimum gain depending on the adjusted feedback resistance forming said current-to-voltage converter; means for establishing an analog-to-digital conversion upper limit voltage level; means for establishing an analog-to-digital conversion lower limit voltage level; upper limit comparing means for comparing the output voltage signal of said current-to-voltage converter to said analog-to-digital conversion upper limit voltage level and providing an upper out of limit signal in response thereto; lower limit comparing means for comparing the analog output voltage signal of said current-to-voltage converter to said analog-to-digital conversion lower limit voltage level and providing a lower out of limit signal in response thereto; gain scale logic means having a plurality of gain select logic stages for increasing said adjusted feedback resistance in response to an upper out of limit signal and for decreasing said adjusted feedback resistance in response to a lower out of limit signal to an adjusted gain scale between said maximum gain and said minimum gain effecting an output voltage signal level between the analog-to-digital conversion upper and lower limit voltage levels; means for providing a digitized output signal of said analog output voltage signal from said analog-to-digital converter after said adjusted gain scale is established by said gain scale logic means; and means for storing said adjusted gain scale and said digitized output signal.

Preferably, the gain control system further comprise: means for providing an over range error signal in response to an upper out of limit signal generated at the minimum gain set by said gain scale logic means; and means for providing a low resolution error signal in response to a lower out of limit signal generated at the maximum gain set by said gain scale logic means.

The invention is preferably implemented in a control system and method for measuring optical power incident on a photodiode detector in the course of calibrating or using a sensitometer which automatically and rapidly selects the appropriate gain for the operational amplifier. This gain selection constitutes an automatic gain scaling function which rapidly selects the proper gain and delivers an analog signal within a range between the upper limit and a lower limit.

ADVANTAGES OF THE INVENTION

The increased speed of the gain scaling circuit is able to deliver 20,000 data samples or readings per second with power changes less than 10:1 and 62 samples per second with power level changes between each sample of 10,000, 000:1. Normally power level changes one scale on the first reading then remains at that power level scale for several steps (on twenty step sample) so readings per second would normally be 20,000 per second with only three readings (at steps crossing over the decade scale change) waiting for a gain change in the 3 Log10 optical power range required for the twenty step sample. The resulting analog output is between 0.9 V and 10.0 V at all covered power levels in a 1:10,000,000 power range.

The varied improvements of the present invention result in a twenty step wedge, photosensitive product test calibration that requires only a few seconds to complete in contrast to the twenty to thirty minutes required with the CVC and DVM described above, thus reducing heating problems with the laser power modulator and allowing a calibration to precede each test wedge exposure of each product sample.

BRIEF DESCRIPTION OF THE DRAWINGS

These and other objects, advantages and features of the invention will become apparent from the detailed description given hereinafter in relation to the accompanying drawings, in which:

FIGS. 2A and 2B combined show one embodiment of a sensitometer system in which the present invention may be implemented;

FIG. 12 is a chart of scale change resistance values inserted into the feedback loop of the gain change logic of FIG. 11 effected in the ladder tree of FIGS. 14A and 14B;

DETAILED DESCRIPTION OF THE PREFERRED EMBODIMENTS

Figure 3:
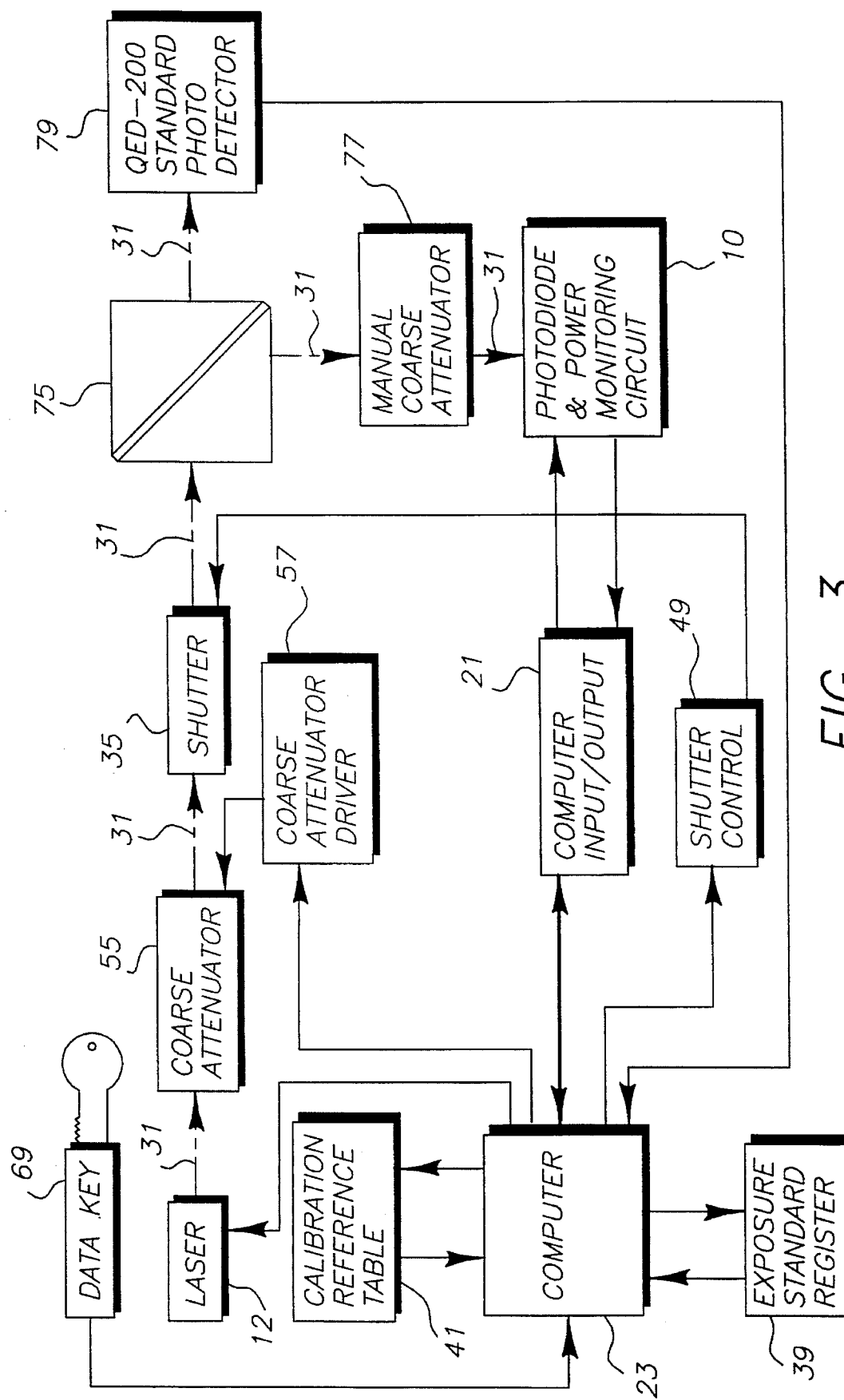
FIG. 3 is a modification of the system of FIG. 1 and depicting the equipment used in a primary calibration mode.
Figure 4A:
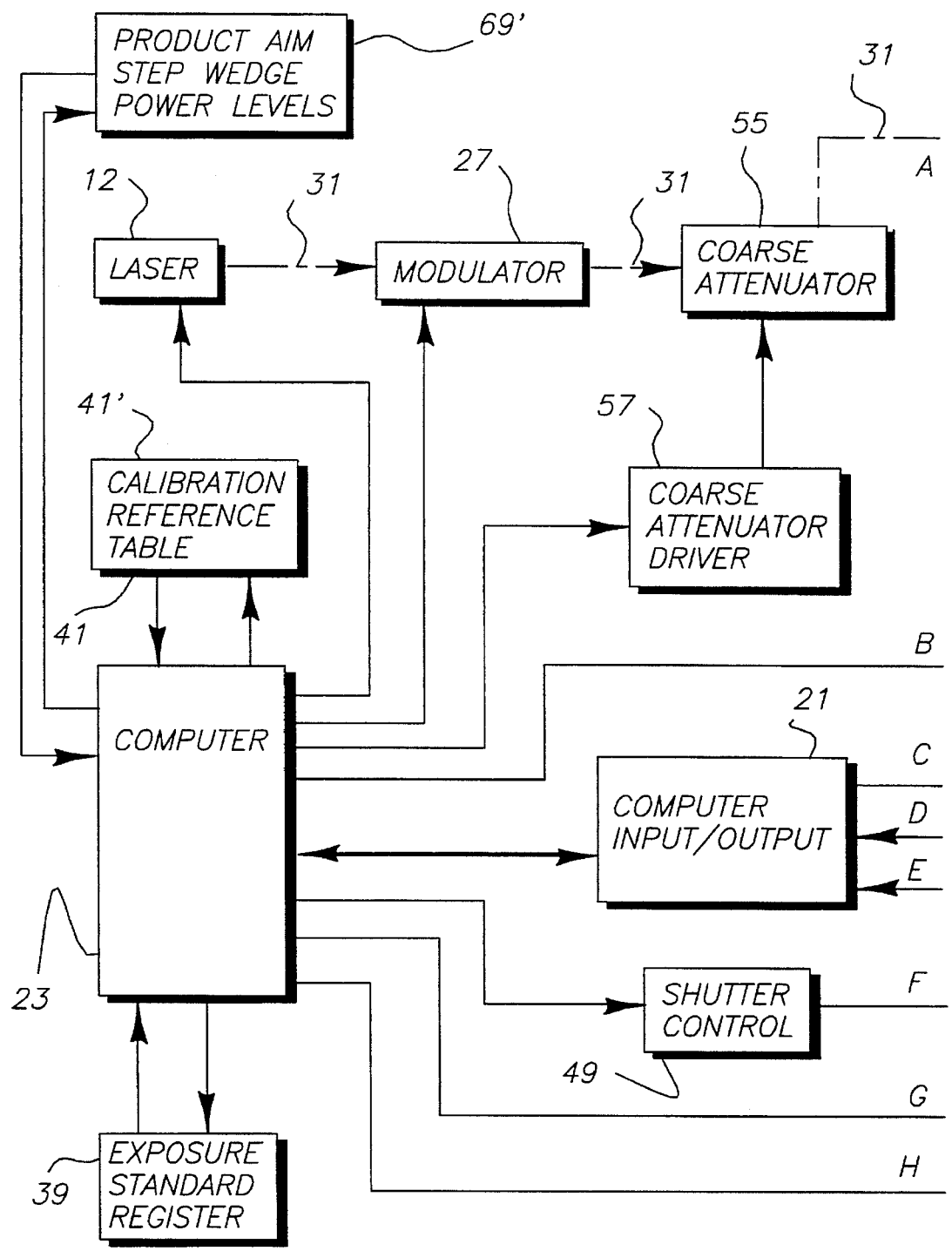
FIGS. 4A and 4B combined show a preferred embodiment of a sensitometer system in which the present invention may be implemented.
Figure 4B:
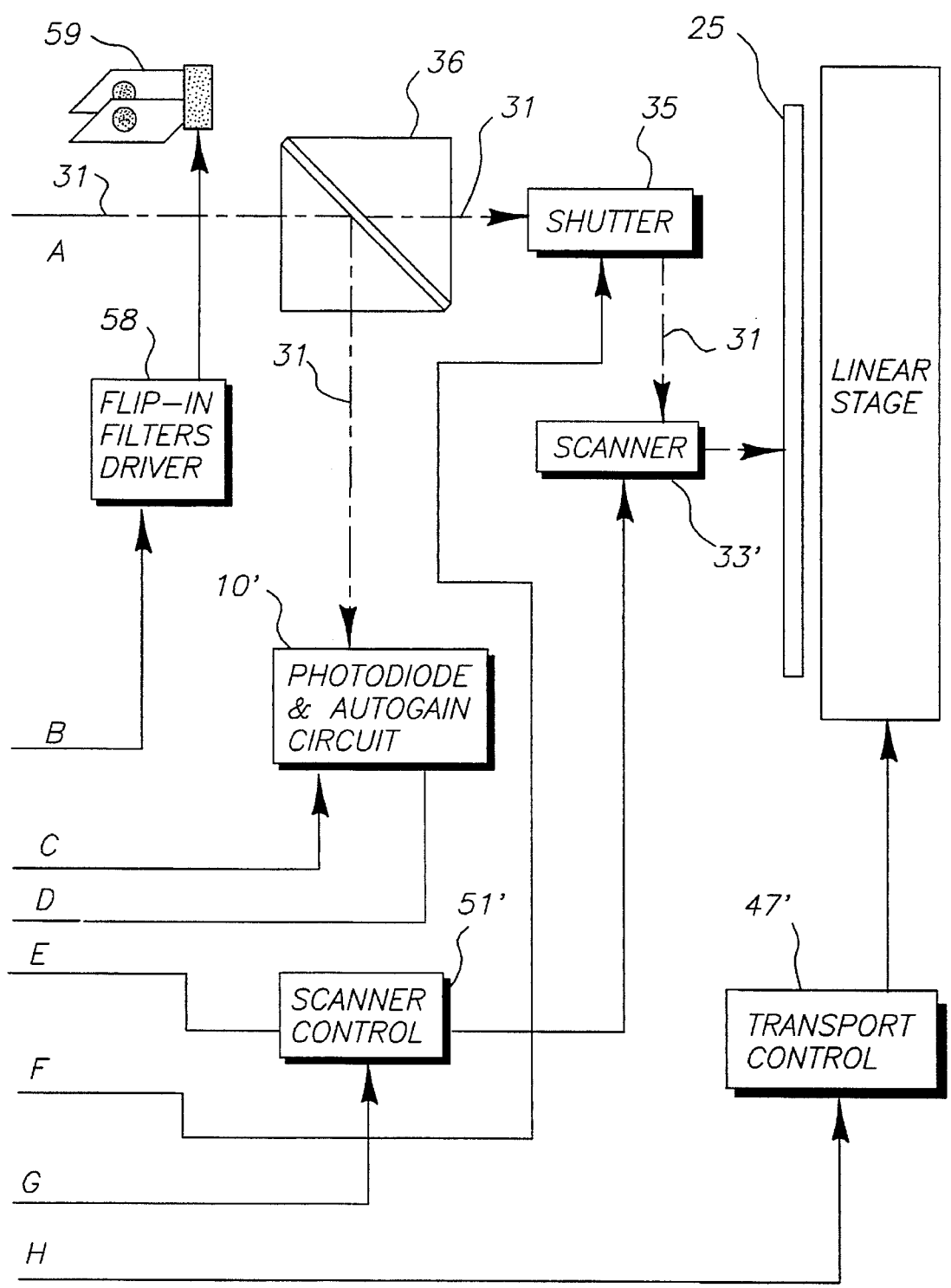

The present invention is preferably implemented in the sensitometer system depicted in the simplified illustration of FIGS. 4A and 4B. The present invention allows the high speed calibration of such a sensitometer system of FIGS. 4A and 4B at all twenty optical power levels prior to commencing the sample exposure mode employing the Autogain circuit and full wedge sample calibration mode described in reference to FIGS. 4A and 4B–14A and 14B. In order to highlight the improvements attained by the present invention, the system of FIGS. 2A and 2B employing the CVC and DVM will first be described operating in the sample exposure mode and the limited calibration check modes as well as a primary calibration mode (in the configuration of FIG. 3) and then contrasted with the system of the present invention.

Figure 1:
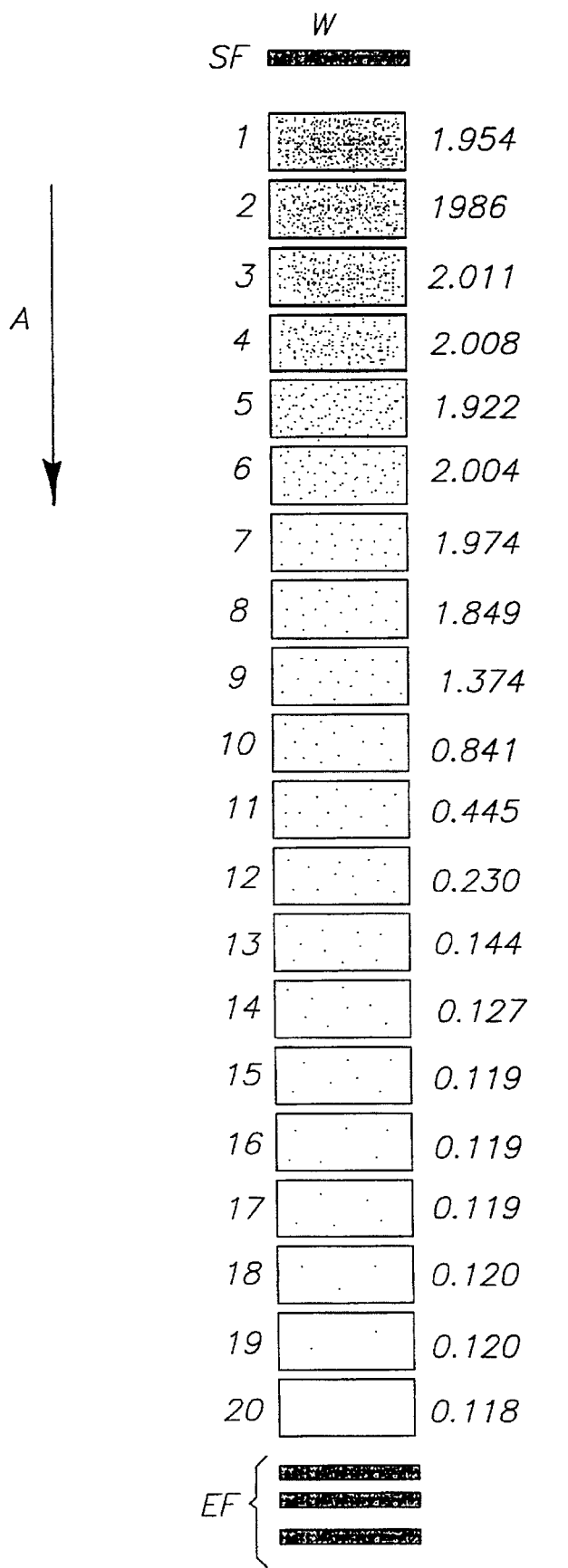
FIG. 1 is an illustration of a twenty band, step wedge exposed on a photosensitive product sample with typical step densities shown beside each band.
Figure 2B:
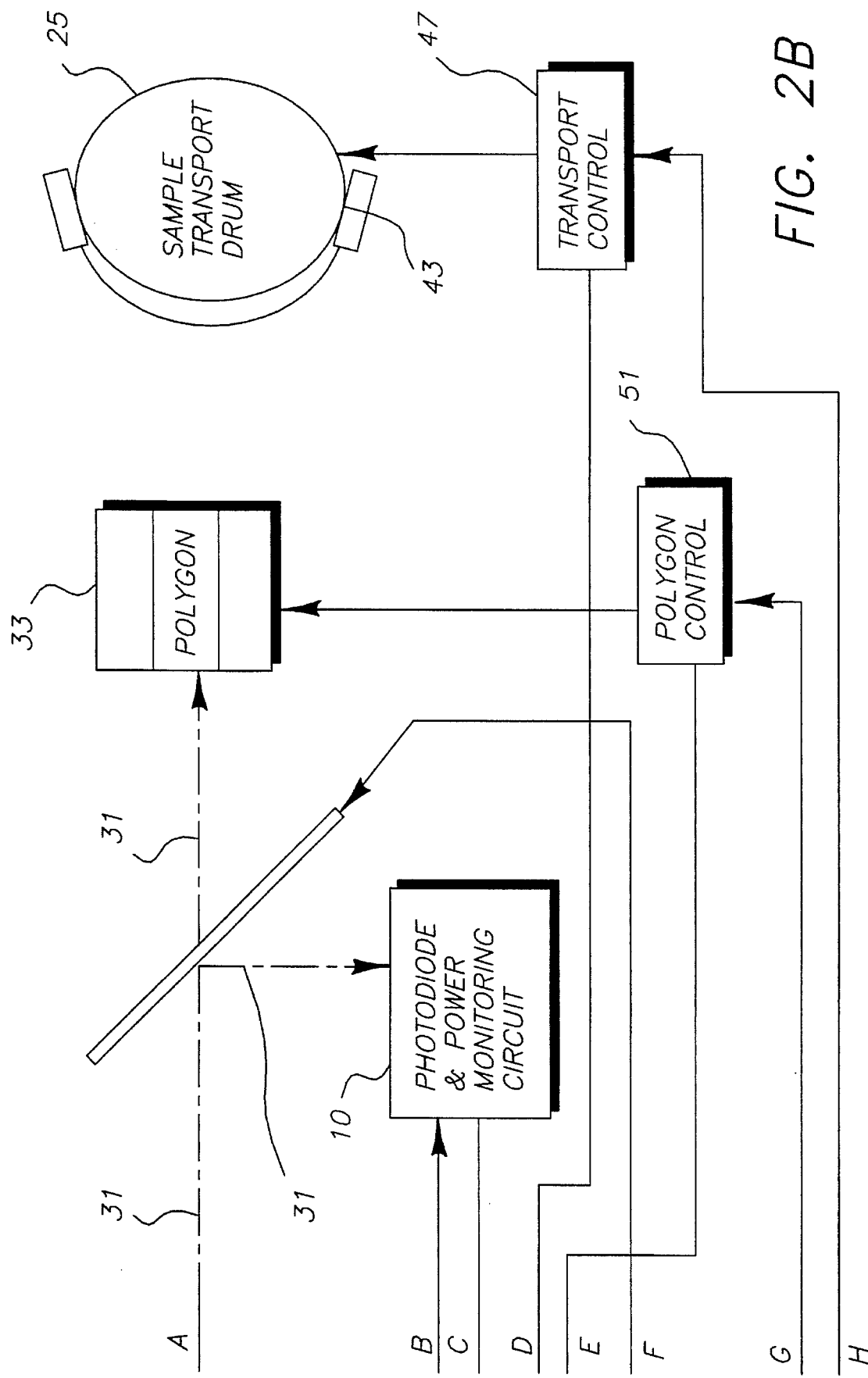

In general, the system computer 23 is programmed to receive status and operating commands and control the operation of the components of the sensitometer system of FIGS. 2A and 2B in exposing a step wedge W (FIG. 1) on the product sample 25 as described above in a sample exposure mode. Prior to each step wedge exposure, a limited calibration check is made at the outset that the system gain is within tolerance, and specifically that the measured optical power levels of the laser beam 31 modulated by the AOM 27 in at least the 1st, 11th, and 20th steps of the 20 step wedge are within the tolerances of defined target optical power levels for each step. If not, then gain calibration is conducted in a calibration mode as described below, which differs from a primary calibration described below that is conducted once per year.

Pre-Exposure Limited Calibration Check Mode (FIGS. 2A and 2B)

Initially, the laser 12 is energized, but the beam is blocked by the closed shutter 35. The computer 23 commands the polygon control 51 to rotate the polygon mirror 33 at the line sweep rate, the flip-in mirror driver 53 to insert the mirror 29 to reflect the diverted laser light beam 31' to the photodiode and power monitoring circuit 10, and the shutter control 49 to open shutter 35. The target optical power level for exposing the center wedge step (step 11 of FIG. 1) is read from the exposure standard register 39 which has all 20 desired target optical power levels derived during the most recent calibration stored for all 20 steps.

The computer 23 operates AOM 27 in the central portion of its range and sets the gain of a transimpedance amplifier of the photodiode and power monitoring circuit 10 in the proper range for the 11 th step power as determined by a previous sample calibration of the target optical power level stored in exposure standard register 39. The resulting output voltage reading of the DVM in the circuit 10 is provided to the computer 23. The computer 23 converts the DVM readings from circuit 10 into measured step optical power levels using the calibration reference table 41 to do so. Then the computer 23 compares the measured 11 th step optical power level against the target optical power level retrieved from the exposure standard register 39.

If the difference exceeds a tolerance range, the computer 23 provides an adjustment signal to coarse attenuator driver 57 which adjusts the coarse attenuator 55 until the compared power difference is within the prescribed plus and minus tolerance range. The computer 23 then reads this power again and stores the measured optical power level in a trace file in terms of delta steps (0.005 Log$_{10}$ per step) of measured optical power level compared to target optical power level. The trace file is stored on the hard disk of computer 23 as a sample related history. This mid-point adjustment of the coarse attenuator 55 is then maintained while the power levels for exposing the 1st and 20th steps or bands are checked and for the balance of the exposure cycle for exposing the full step wedge W.

These steps are repeated for the 1st and 20th steps, using the appropriate stored target optical power levels for adjusting the AOM 27 while retaining the center adjustment of the coarse attenuator 55 fixed and comparing the measured optical power levels to the target optical power levels. If either measured optical power level is out of tolerance, the computer 23 starts the calibration mode described below. If the measured optical power levels are within tolerance, the step wedge exposure commences.

Sample Step Wedge Exposure Mode (FIGS. 2A and 2B)

Continuing with the exposure of step wedge W, the AOM 27 is now set to OFF by an OFF signal from the computer 23, and the sample transport control 47 is started to rotate drum 43 in the advance direction A. The computer 23 sends a signal to the flip-in mirror driver 53 to retract flip-in mirror 29 from the laser beam 31, and the system waits for the transport 43 to reach a starting point as determined by computer 23 from a drum "home" signal from the transport control 47 and from counted rotations of the mirror 33 facets.

Start fiducial(s) SF (FIG. 1) is written on the product sample 25 by the computer 23 sending an ON signal to the AOM 27, thereby directing the laser light beam 31 at full intensity to the polygon mirror 33. The polygon mirror 33 facets deflect the beam 31 in each line sweep, and a mirror facet position signal is provided to the computer 23 at a predetermined line sweep start and stop angular position of the mirror facets. Computer 23 provides the OFF signal to AOM 27 to direct the laser light beam 31 away from the mirror 33 in response to the stop position signal of each single line sweep and then provides the same full power level signal at the start position signal of the next line sweep. Line exposures continue for a predetermined count of the mirror position stop signals to provide a set width of the SF line of FIG. 1.

The computer 23 then sets the AOM 27 to a 1st step target optical power level, using the AOM drive code obtained from the exposure standard register 39, and counts mirror facet position signals as the sample 25 is incrementally advanced in the advance direction A. Band 1 of step wedge W is then exposed in the same fashion as the SF line for the predetermined number of line sweeps defining the width of the bands 1–20. Between sweep lines between successive step exposures, the computer 23 changes the drive code to the AOM 27 to set it for the next step target optical power level retrieved from the exposure standard register 39. After the last band 20 is exposed, one or more end fiducial(s) EF is exposed on the sample 25 in the same manner as described above with respect to the exposure of start fiducial(s) SF. The flip-in mirror 29 is then flipped in to prevent any further exposure until the sample 25 is removed from the drum 43. The shutter 35 is then closed, and the sample transport 43 is turned off.

The full sample exposure of the step wedge W and the calibration checks of the 1st, 11th and 20th step optical power levels take about 30 seconds to complete, and this short time is insufficient to cause temperature dependent intensity distortion to occur in AOM 27. The system is not fully tested for calibration as a result of the limited calibration check. The limited calibration check only removes bias shifts caused by heating of the AOM 27 during an earlier full calibration.

Full Scale Calibration Mode (FIGS. 2A and 2B)

The limited calibration checks are made prior to each sample exposure and also upon powering up the system and after any maintenance testing that may be performed. If either measured optical power level of the 1st or 20th step is out of tolerance, the following full scale exposure calibration mode commenced.

At the outset, the laser 12 is already on, and the flip-in mirror 29 is flipped in, the shutter 35 is opened, and the coarse attenuator 55 is opened all the way to its home position. The target step power levels for each of the 20 steps of the step wedge W are retrieved from within the memory 69 specific to the photosensitive product sample 25 to be exposed. The memory 69 is preferably a key shaped, non-volatile read/write memory inserted into an interface of the type available from Datakey, Inc., Bloomington, Minn., and contains target step power levels specific to the photosensitive product 25 for all 20 steps of the step wedge W. The gain of a transimpedance CVC amplifier in photodiode and power monitoring circuit 10 is set to its lowest level to respond to high power levels (assuming that the diverted laser beam 31' optical power may be high), and the AOM 27 is set to its mid-point.

In the initial part of the full scale calibration process, the coarse attenuator 55 is adjusted by coarse attenuator driver 57 until the target optical power level for the 11th step and the measured optical power level match, within tolerances. Then, the coarse attenuator driver 57 setting is then fixed, and AOM drive codes are established at each of the other target optical power levels and stored in the standard exposure register 39 as follows.

First, the 11th step target optical power level is retrieved from Datakey® memory 69 and is converted to the equivalent photodiode and power monitoring circuit 10 DVM voltage level using a value stored in calibration reference table 41 which is generated and saved during a primary calibration. This is necessary to relate the target optical power level stored in the Datakey® memory 69 to the actual optical power level at the product sample 25, the results stated in terms of an 11th step AOM drive code to be stored in the exposure standard register 39 after the full scale calibration. Plus and minus tolerances for the 11th step are calculated for the 11th step target optical power level retrieved from Datakey® memory 69 and converted to the equivalent photodiode and power monitoring circuit 10 DVM voltages, using the value saved in the calibration reference table 41, and stored for later use in the calibration process.

The AOM 27 is then operated at a fixed mid-point AOM drive code to reduce the intensity or energy of the laser light beam to one-half full intensity or energy. The coarse attenuator 55 is set to the home or fully ON, non-attenuating position. The measured analog power level of the light beam 31' from the CVC circuit in photodiode and power monitoring circuit 10 is digitized by the internal DVM and sent through the computer input/output 21 to computer 23. Computer 23 digitally compares the measured optical power level to the converted target optical power level for the 11th step. The measured optical power level will exceed the calibrated reference power level because the coarse attenuator 55 is still set to the home or fully ON, non-attenuating setting.

The computer 23 then adjusts the coarse attenuator 55 through 100 increasing attenuation steps, then takes another measurement and compares the measured power level to the calibrated reference power level. If the measured optical power level still exceeds the target optical power level, the computer 23 steps the coarse attenuator 55 down another 100 increasing attenuation steps through instructions to coarse attenuator driver 57. These cycles are repeated until the measured optical power level falls below the target optical power level plus the negative tolerance. The computer 23 then adjusts the coarse attenuator 55 back up ten decreasing attenuation steps and repeats the measurements, comparisons, and any further necessary adjustments until the measured optical power level again exceeds the target optical power level.

The computer 23 then steps the coarse attenuator 55 by one increasing attenuation step, compares the measured and target optical power levels, and repeats the process until the measured optical power level is again below the target optical power level. The computer 23 checks the difference against the plus and minus tolerances, and, if it is within these limits, the AOM 27 drive code is saved in the exposure standard register 39 as the 11th step calibrated power value. The coarse attenuator setting is not changed during the remaining calibration steps and during sample exposures.

Next, the target optical power level for the 20th step is retrieved from the Datakey memory 69, converted to comparable DVM values using the calibration reference table 41 and stored in the exposure standard register 39. The plus and minus tolerances are similarly calculated and converted to DVM values and stored for later use in the calibration process. The computer 23 then sets the AOM 27 for maximum beam power, i.e., fully ON, enables the photodiode and power monitoring circuit 10, and compares the 20th step DVM measured optical power level against the 20th step target optical power level in the exposure standard register 39.

If the measured step optical power level exceeds the target optical power level, the computer 23 steps the AOM 27 through 100 attenuation counts and repeats the process until the measured optical power level no longer exceeds the target optical power level. The process as described above for the adjustment of the coarse attenuator 55 is repeated for the AOM 27 (the coarse attenuator 55 is fixed at its step 11 determined position) to zero in onto a difference between the measured optical power level and the target optical power level that falls within defined tolerances. The resulting AOM drive code for the setting of the AOM 27 is stored in the exposure standard register 39 with the 20th step target optical power level.

This process is repeated for the remaining 18 steps of the step wedge to derive the twenty step target optical power levels stored in the exposure standard register 39 for the product type and for the specific sensitometer system.

Primary Calibration Mode (FIG. 3)

A primary calibration is performed at least yearly using the configuration of FIG. 3 to calibrate the delta power accuracy of the photodiode and power monitoring circuit 10 and stored in calibration reference table 41. The absolute power calibration is done after the calibration reference table 41 is completely filled out with the following coupled data values: 1) target optical power levels; 2) primary standard photo detector beam power level readings; and 3) photodiode and power monitoring circuit 10 DVM power level readings. The latter two readings are measured optical power levels. The calibration reference table is used by the computer 23 to make a conversion from one reading value to another.

Primary calibration requires an additional beam splitter 75 and a further mirror (not shown). The mirror is added in front of the AOM 27 in FIGS. 2A and 2B and deflects the laser light beam outputted from laser 12 into the beam splitter 75 which divides it into the split laser light beam 31' directed to the photodiode and power monitoring circuit 10 and into the laser light beam 31" directed to an added standard, the QED-200 standard photo detector 79 available from United Detector Technology, Inc., Hawthorne, Calif. The intensities of the split laser light beams 31' and 31" do not have to be exactly equal but should be close to equal (±10%) to simplify the calibration. A manual coarse attenuator 77 is added in front of the photodiode and power monitoring circuit 10 and is set to minimum attenuation. Using the QED-200 standard photo detector 79, the computer 23 adjusts the coarse attenuator 55 until the QED-200 photodetector 79 measures 0.001 watts of optical power. With approximately a 50% split of the beam intensities achieved by splitter 75, 0.001 watts of optical power is also directed in split light beam 31' to the photodiode and power monitoring circuit 10. The split in intensities can be used as a mathematical factor to weight the measured intensities, if necessary.

A delta 0.005 Log10 power table of optical powers in steps of 0.005 Log10 resides in a file in the computer 23 hard disk starting at 0.001 watts and decreasing to 0.0000001 watts. With the beam power level of split light beams 31' and 31" at 0.001 watts as set above, the computer 23 reads and stores the beam power levels measured by the QED-200 standard photo detector 79 and the photodiode and power monitoring circuit 10 in the calibration reference table 41. The next lower power is selected from the delta 0.005 Log10 power table, and the coarse attenuator 55 is adjusted so that the beam power level is measured at the QED-200 standard photo detector 79. Again, the two measured optical power levels are read and stored in correlation in the calibration reference table 41. This process is continued through a power level of 0.0001 watts, as the two measured optical power levels are read and stored in the calibration reference table 41. The power level is again then adjusted by the computer 23 via the coarse attenuator 55 to a power level of 0.001 watts of split light beam 31" as measured at the QED-200 standard photo detector 79.

Then, the computer 23 prompts the operator to adjust the manual coarse attenuator 77 to further attenuate the beam power level of split light beam 31". While the adjustment is being manually made, the computer 23 displays the difference between the current measured optical power level from the DVM in photodiode and power monitoring circuit 10 and the measured optical power level that was captured previously at 0.0001 watts of optical power by the computer 23 from the DVM in photodiode and autogain circuit 10. This procedure effects a 1.000 Log10 power difference between the QED-200 standard photo detector 79 (with 0.001 watts) and the photodiode and power monitoring circuit 10 (with 0.0001 watts).

The primary calibration procedure starts again continuing down the computer 0.005 Log10 power table from the ending point of 0.0001 watts. The next decade of power levels are measured in steps of 0.005 Log10 and stored in the calibration reference table 41 in the same manner as set forth above. The power level is again then adjusted by the computer 23 via the coarse attenuator 55 to a power level of 0.001 watts as measured at the QED-200 standard photo detector 79. Then as above, the computer 23 prompts the operator to adjust the manual coarse attenuator 77 to attenuate the split light beams 31' and 31". While the adjustment is being manually made, the computer 23 displays the difference between the current power level and the power level which was captured at 0.00001 watts of optical power by the computer 23 from the DVM in photodiode and autogain circuit 10.

This procedure effects a 2.000 Log10 power difference between the QED-200 standard photo detector 79 (with 0.001 watts) and the photodiode and power monitoring circuit 10 (with 0.00001 watts).

This process is repeated for the balance of the decades which provides the QED-200 standard photo detector 79 with a range of one decade, 0.001 to 0.0001 watts, which reduces noise and dark current considerations from the process. However, the photodiode and power monitoring circuit 10 has a power range of four decades 0.001 to 0.0000001 watts.

The primary calibration test fixture, including the additional mirror (not shown), beam splitter 75 and QED-200 standard photo detector 79, is then removed and the optical path returned to normal as shown in FIGS. 2A and 2B. The sample transport drum 43 is removed, and a "Lab Master®" model LM-E+ photo detector calibrated by the National Bureau of Standards is inserted in its place to receive the light beam 31. The optical power is adjusted manually by changing the settings of the AOM 27 and under the control of the computer 23 changing the coarse attenuator 55 to obtain the standard power level of the 11th step of the wedge using a standard target value read on the Lab Master® photo detector for the target optical power level.

The model LM-E+ photodetector standard power output target may be 2.26 microwatts, for example, which the coarse attenuator 55 would be adjusted to obtain. When the standard power is established, the flip-in mirror 29 is inserted into the beam, and the optical intensity of split beam 31' is measured in photodiode and power monitoring circuit 10 and is read by the computer 23 and stored temporarily. The measured optical power level is then converted to an optical power reading using the value in calibration reference table 41. This power reading now becomes the target step power level for the 11th step to be stored on a new Datakey® memory 69. The computer 23 then sequentially requests the delta Log10 increment to be input for each step interval. The balance of the twenty target step power levels are derived using the delta Log10 step increments, and the resulting optical power readings are stored the new Datakey® memory 69.

As is apparent from the above, both the sample exposure calibration and the primary calibration of the system of FIGS. 2A and 2B and 3 are extremely tedious and time consuming. In accordance with the present invention, that time is reduced substantially by an improved circuit configuration and method of operation incorporated into the photodiode and power monitoring Autogain circuit 10' of FIGS. 5–14A and 14B preferably incorporated into an improved sensitometer of FIGS. 4A and 4B.

The FIGS. 4A and 4B Sensitometer System

The sensitometer system of FIGS. 4A and 4B employs a linear translation stage 43', against which the product sample 25 is placed, and a scanner 33' for sweeping the laser beam 31 in the line sweep direction. The linear stage 43' is used in place of the sample transport drum 43 of the sensitometer of FIGS. 2A and 2B to facilitate easier sample loading and unloading. The scanner 33' may constitute a pentaprism connected to the shaft of a precision, regulated speed motor driven by scanner control 51'. Line sweeps are counted by counting the revolutions of the scanning motor which has a reference output signal delivered to the computer 23 from the scanner control 51' each revolution.

The Datakey® memory 69 is not used in the sensitometer of FIGS. 4A and 4B because the power levels for each step is stored on the hard drive of computer 23 in a product aim step wedge power levels file 69'. Each product type has its own unique file 69' to store the power levels needed for each of the twenty steps of the step wedge. The power values in that file are the actual power required at the product plane of the linear stage 43'.

The beam splitter 36 is used in place of the flip-in mirror 29 of the sensitometer of FIGS. 2A and 2B to allow monitoring of the power levels of the split laser light beam 31' during the sample exposure mode and the calibration mode of the present invention. The Autogain circuit 10' has a much better signal-to-noise ratio than the CVC and DVM of the circuit 10 of FIGS. 2A and 2B, so lower power levels of the split light beam 31' from the beam splitter 36 can be measured reliably.

Flip-in filters 59 are also provided and inserted selectively into the laser beam 31 under the control of flip-in filters driver 58 and computer 23. Flip-in filters 59 provide auxiliary attenuation in achieving the laser beam energies necessary to provide the exposures of the steps from about step 10 to step 20 in the typical step wedge W of FIG. 1. Flip-in filters 59 are not used in the sensitometer of FIGS. 2A and 2B because the AOM 27 control range is limited to less than the 3 $\log_{10}$ range required.

Referring to an operating cycle of the sensitometer of FIGS. 4A and 4B, first the computer 23 verifies that the shutter 35 is closed via the shutter control 49 and commands the scanner control 51' to start rotation of the scanner 33'. Prior to each exposure of a product sample 25 mounted on the linear stage 43, a full wedge sample calibration is conducted to calibrate the energy of the laser beam 31 delivered at each of the target step power levels of the 20 steps dictated by the stored target optical power levels for the particular product type resident in exposure standard register 39. A primary calibration is also performed periodically.

Sample Calibration Mode (FIGS. 4A and 4B)

The computer 23 verifies that the shutter 35 is closed (via the shutter control 49), that the flip-in filters 59 are not in (via the flip-in filters driver 58), that the laser 12 is on and commands the scanner control 51' to commence rotating the scanner 33' so that it is up to speed when it is needed. The split laser light beam 31' is thereby directed to the Autogain photodiode and monitoring circuit 10'. The range of the AOM 27 is first checked to verify that it, along with the auxiliary attenuation provided by flip-in filters 59, is sufficient to produce the full range of steps in the exposure, typically 2.85 to 3.0 Log10. If so, the highest modulating voltage is determined that will produce sufficient power to expose the highest density power level retrieved from the product aim step wedge power levels file 69' which contains the target optical power levels for each of the twenty steps of the step wedge. This is done by setting the AOM 27 voltage to 10 V and reducing it by 0.1 volt increments until the response of the Autogain circuit 10' is reduced by the same increment, to within some delta tolerance. The AOM 27 drive circuit is then assumed to be out of the saturation region and responding linearly. With the modulation voltage set to this maximum value, the coarse attenuator 55 is then adjusted under control of driver 57 in such a direction as to bring the laser power at the sample 25 to the highest exposure level of step 1 of the step wedge to be exposed, within some tolerance, as determined by the measured optical power level from Autogain circuit 10'. The adjustment of coarse attenuator 55 is stopped, and the modulation voltage to AOM 27 is varied slightly until the laser power is correct to within a much tighter tolerance, e.g. 0.0005 Log10 as determined form the measured optical power level.

The modulation voltage applied to AOM 27 is recorded in the exposure standard register 39 in an array to be later used as a 1st step AOM drive code in the exposure scanning process. The beam power level for the next step is retrieved from the file 69', and the modulation voltage to be applied to the AOM 27 for the next step is estimated by reducing the derived modulation voltage by the same fraction as the reduction in the exposure level defined for the next step. For example, if a 0.15 Log10 reduction in exposure is required from step 1 to step 2, then the step 2 modulation voltage would be estimated by reducing the step 1 voltage by 0.15 Log10. The response of the AOM 27 control circuit is linear over the bulk of its range, and this linearity makes the simple estimation possible. The coarse attenuator 55 is not adjusted, and the modulation power to the modulator 27 is varied from the estimate above to obtain the desired power level measured by the Autogain circuit 10' with the same tolerance as in the first step described. The resulting drive modulation voltage to the AOM 27 and the status of the flip-in filter 59 is then stored in an array in the exposure standard register 39 referenced to the specific product as the next step AOM drive code.

The AOM drive code for each step is sequentially computed in this way. At some point near the 10th step, the flip-in filter 59 is required in the beam 31 to provide auxiliary attenuation. At this point, the modulation voltage is increased to a point near the top of the range as a function of the constant intensity attenuation provided by the flip-in filter 59. The remaining step wedge AOM drive codes are then generated and stored in the array in exposure standard register 39 using the same procedure as outlined above.

This process is speeded by the rapid response of the Autogain circuit 10' as described in detail below.

Sample Exposure Mode (FIGS. 4A and 4B)

The product sample 25 is mounted to linear stage 43' that is shifted laterally to the scan line to allow the successive exposure of a predetermined number of scan lines until the fiducials and step wedge exposure bands at each intensity are fully exposed. As the product sample 25 is being exposed, the laser light beam 31 is diverted into a scan line by a pentaprism 33' operated by scanner control 51' and is passed through the open shutter 35 as it is swept across the product sample 25. The linear stage 43' is shifted upward by stage control 47' for each line of the fiducial or step being exposed.

Shutter 35 is opened by computer 23 sending a signal to the shutter control 49. Starting fiducial(s) SF are written on the sample 25 by the computer 23 sending the fully ON and fully OFF signals to the AOM 27 to mark the start of the exposure area as described above with respect to FIGS. 1 and 2A and 2B. The computer 23 then retrieves the AOM drive code of the 1st step, obtained from the exposure standard register 39, to set the power level on the AOM 27. The computer 23 also controls the operation of AOM 27 such that the energy of the laser beam 31 conforms to a the target optical power level defined by an AOM drive code in exposure standard register 39 for the type of media being exposed.

The laser light beam is modulated in intensity by AOM 27 and split by beam splitter 36 to thereby pass the split light beam 31 to the scanner 33' and the split light beam 31' to the Autogain circuit 10'. The exposure energy is changed to the next band exposure level drawn from the exposure standard register 39 at an appropriate number of fine scans of the beam for each band. Synchronization of the stage transport control 47' and the scanner control 51' is effected by timing signals from the computer 23. When all wedge bands are exposed (in less than 35 seconds), the media sample 25 is withdrawn from the enclosed linear stage 43' and developed.

During the sample exposure mode, the energy of the laser beam 31 is continuously monitored through the diversion of the split beam 31' to the photodiode of Autogain circuit 10' described in greater detail below in reference to the remaining figures. The circuit 10' provides a set of signals to the computer 23 including the a digitized value of the actual measured signal gains for record keeping in association with the sample 25. For example, the actual values may be written by the laser beam onto the exposure sample 25 in relation to the exposed step wedge, along with the time, date and any retrieval code for locating the values in memory of computer 23.

Scaling, as will be described in more detail below, maintains an analog output signal from Autogain circuit 10' between the upper (10.0 volt) and lower (0.9 volt) signal levels for all gain scales. The current gain scale in use is digitally sent to the computer input/output 21. Gain scaling is accomplished by the Autogain circuit 10' which provides a speed advantage over the system of FIGS. 2A and 2B. Other functions of Autogain circuit 10' are described below in detail.

Primary Calibration (FIGS. 4A and 4B)

The primary calibration is accomplished by modulating the laser light beam power to two levels within a gain scale using neutral density filters 59 and the active feedback controlled AOM 27 and/or the coarse attenuator 55. Preferably, the two levels are high and low, e.g. 9.9 V and 0.91 V applied to the AOM 27. At each of these levels, a power level reading is taken at the plane of linear stage 43' with a traceable standard detector such as the Newport hand held optical power meter model 840 from available from Newport Corp., Irvine, Calif. At the same time, the Autogain circuit 10' provides measured voltage output signal to computer input/output 21 representative of the energy of split laser beam 31'. A proportionality constant is computed by dividing the film plane power measured by the optical power meter in microwatts by the Autogain circuit 10' measured voltage output signal in volts. The two readings at the two levels are made to verify the calibration constant as well as check for linearity over the 1.0 Log10 range of the AOM 27. The correction factors are stored in the calibration reference table 41' for use during the sample exposure calibration process. The power range is changed to the next Autogain circuit scale (in a manner described in detail below) in response to a change in the intensity of the split laser light beam 31' by a signal sent to the coarse attenuator 55 or the AOM 27. The voltage and power readings are again taken at the two points are again calibrated and this next scales coefficients are stored in the reference table 41, changed to the next scale, until all usable scales are calibrated.

The Autogain Circuit

Figure 5:
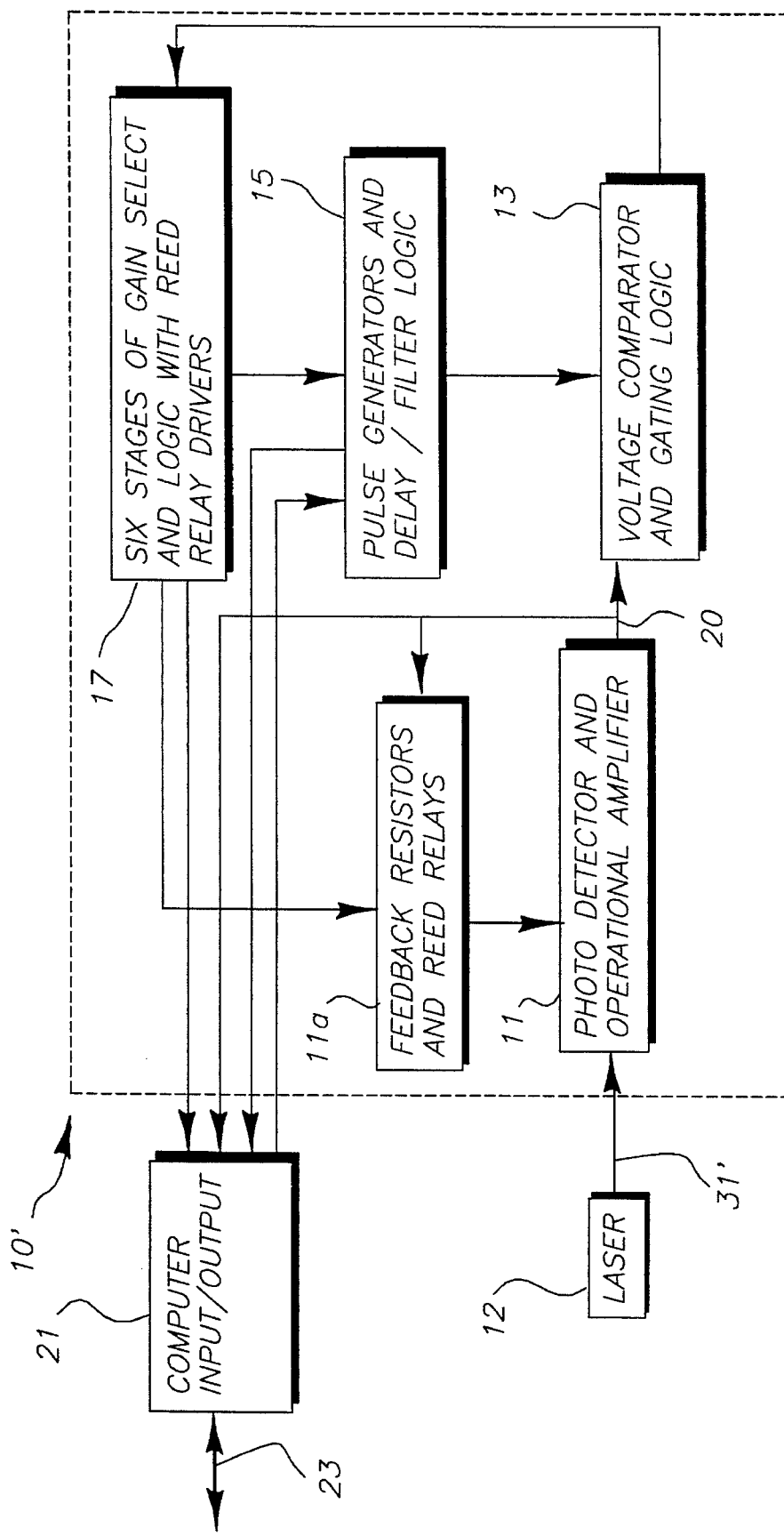
FIG. 5 is a top level block diagram of the Autogain, automatic ranging, optical power monitoring circuit of the present invention which may be employed in the systems of FIGS. 2A and 2B or 4A and 4B.
Figure 6A:
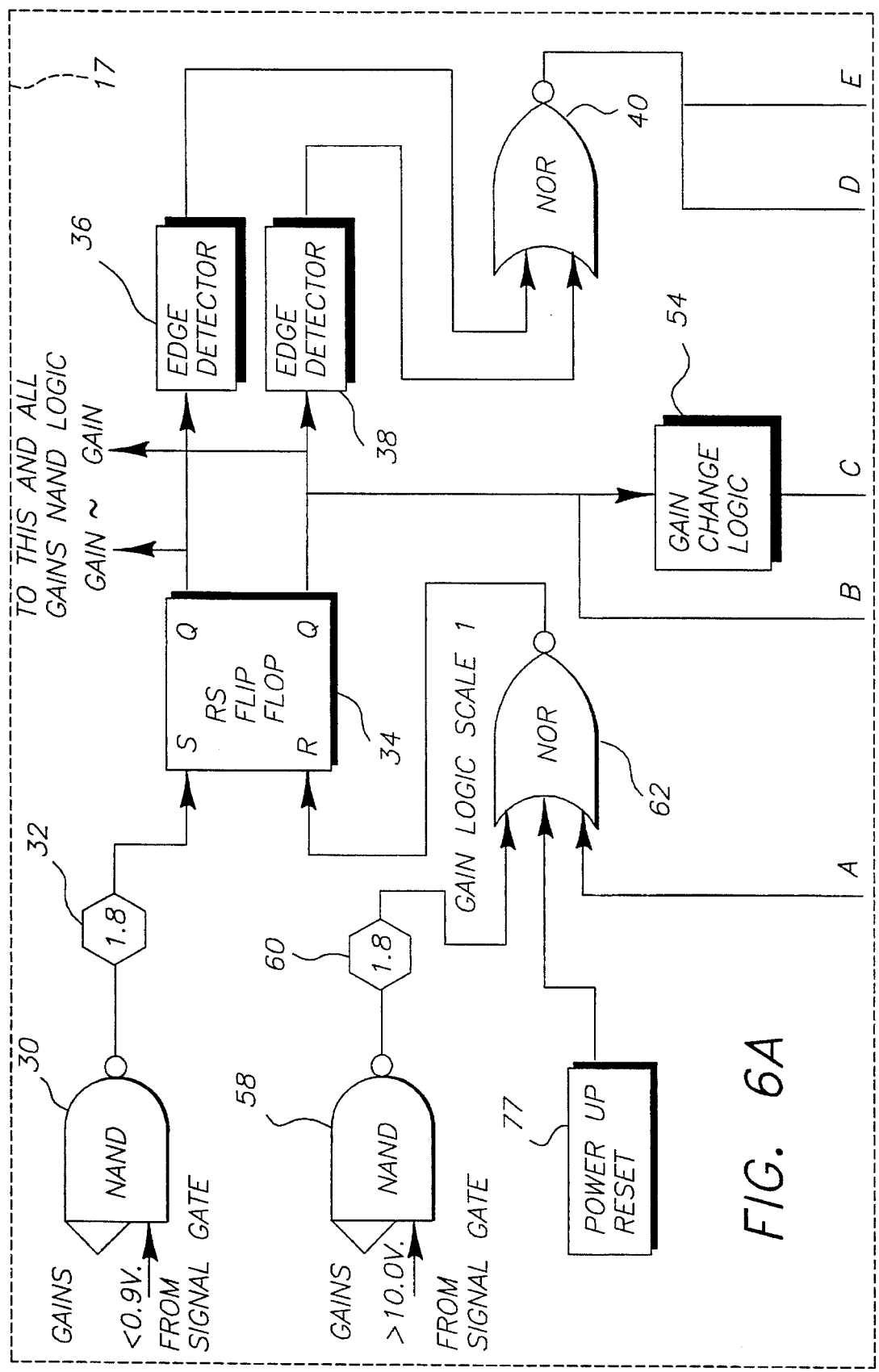
FIGS. 6A, 6B, 6C and 6D combined is a block diagram partially subdivided to show the Autogain, automatic ranging, optical power monitoring circuit of the present invention.
Figure 6B:
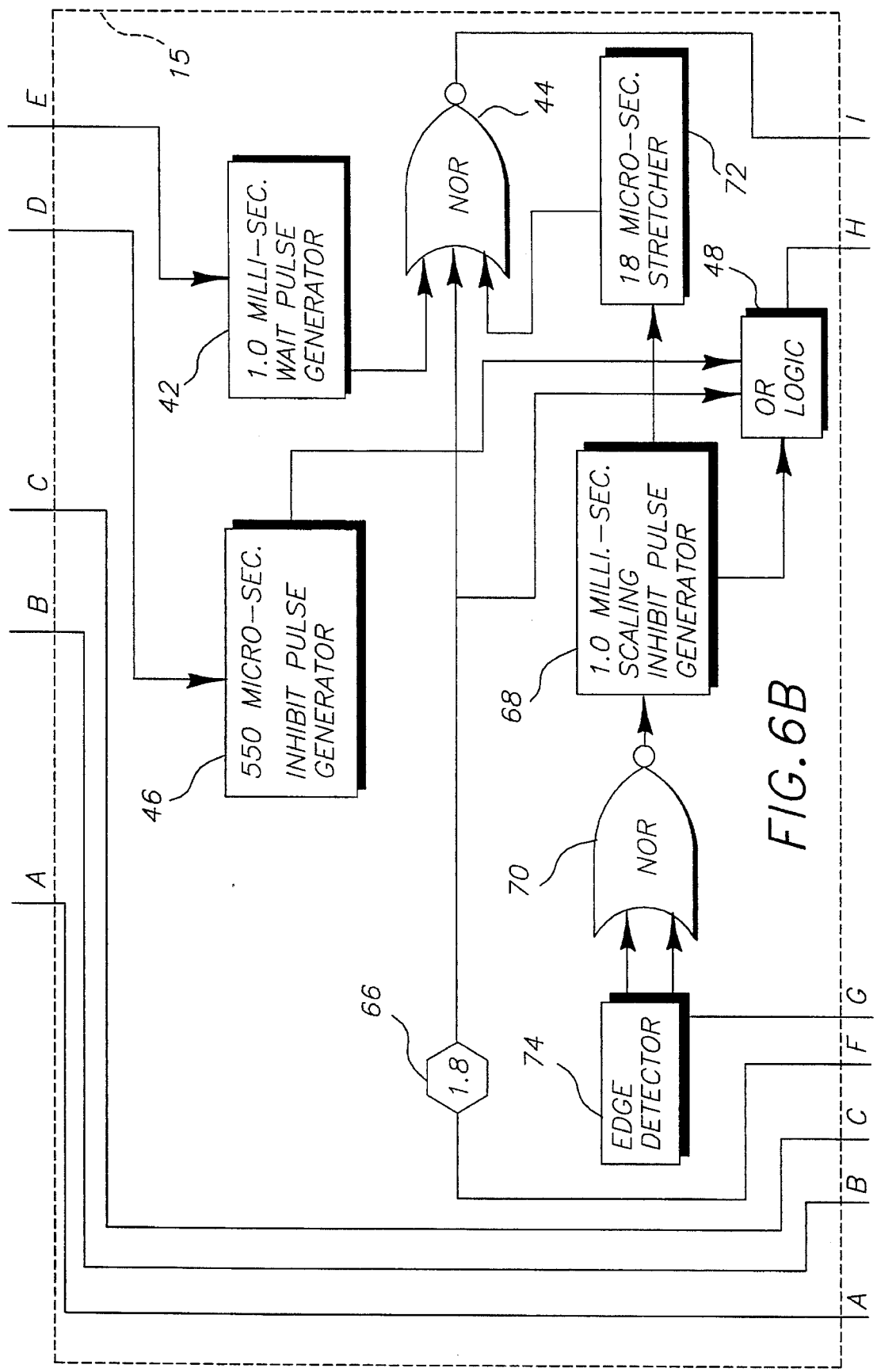
Figure 6C:
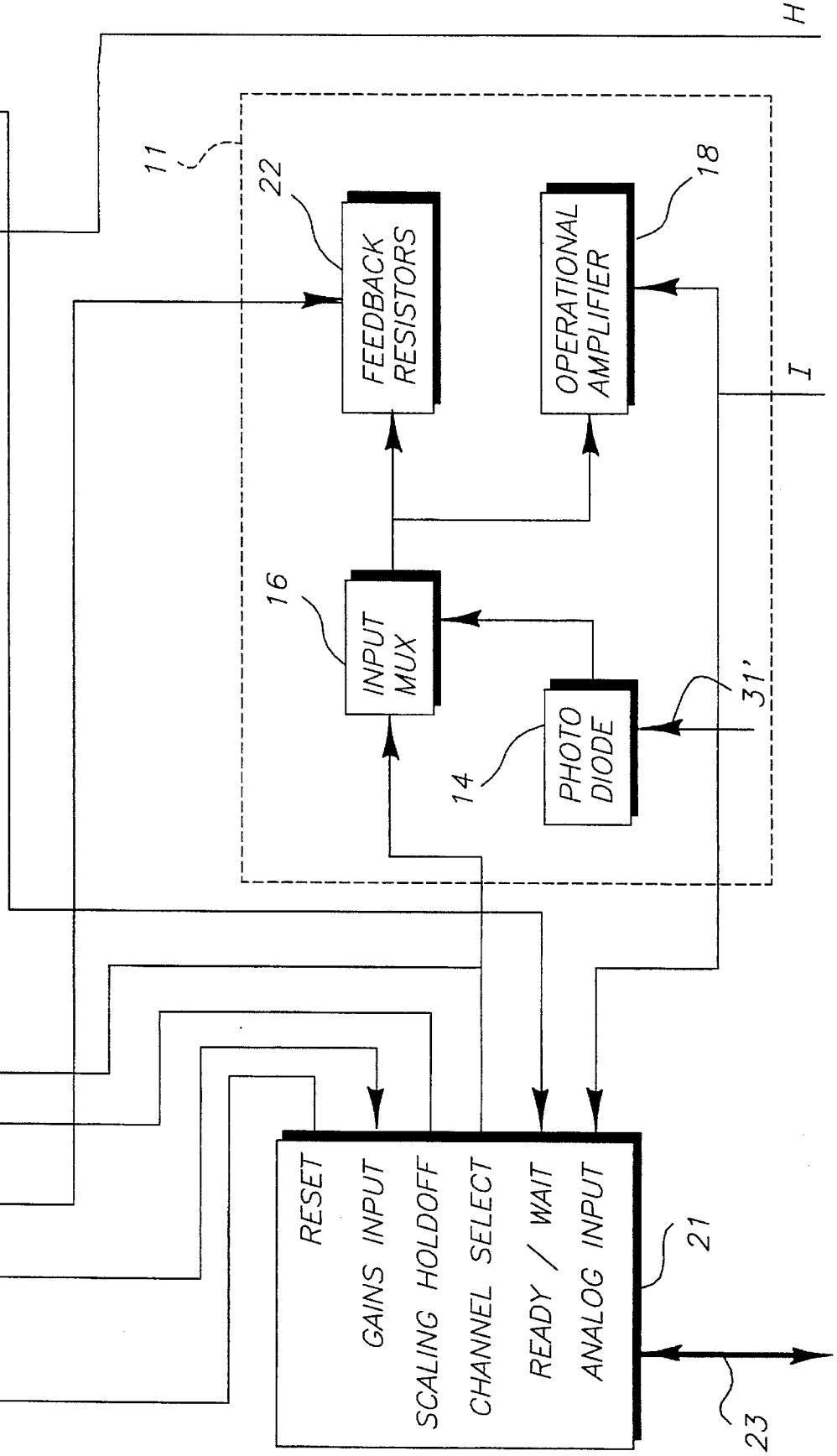
Figure 6D:
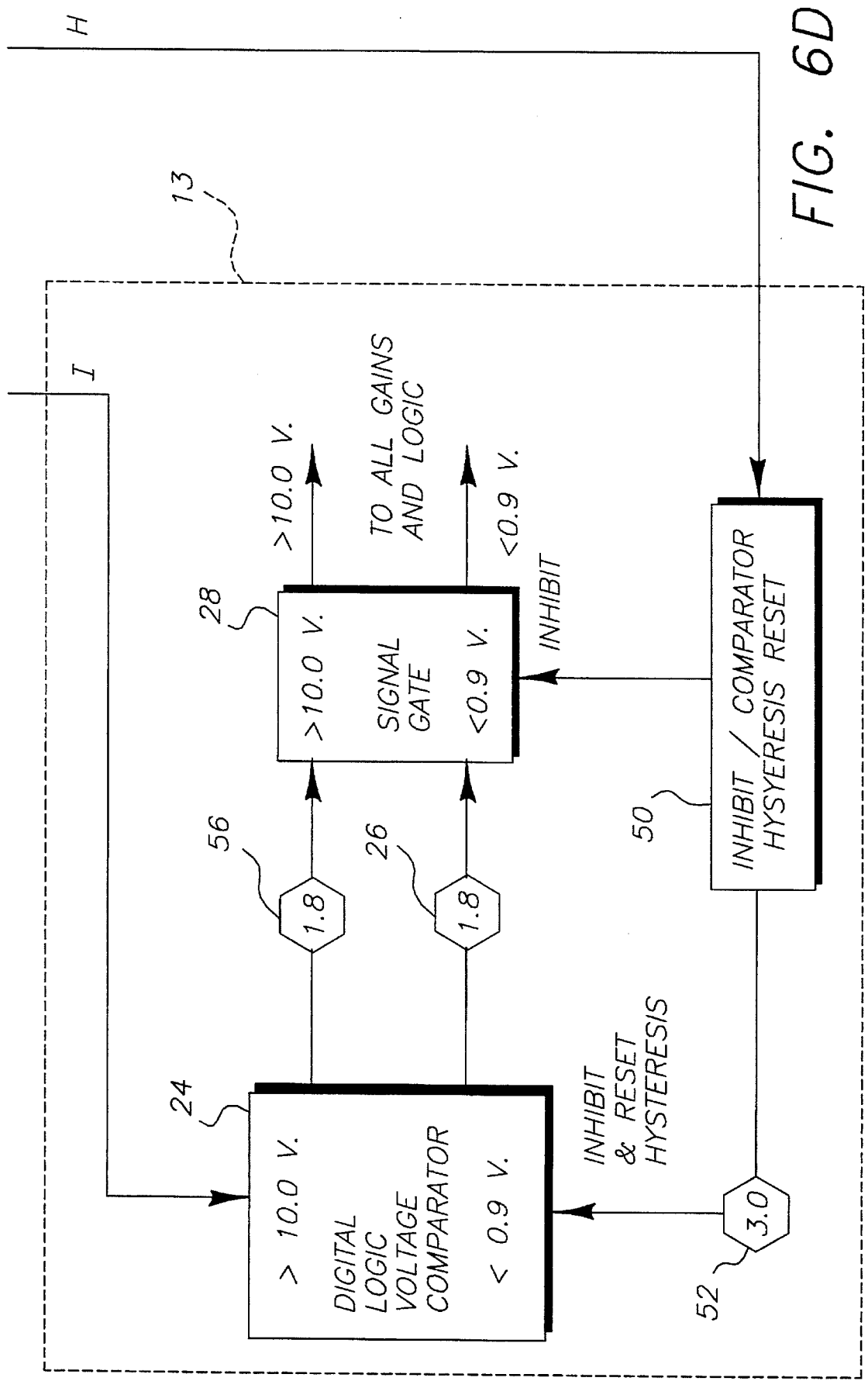

Turning now to FIG. 5, it depicts a top level block diagram of the multigain, automatic ranging, photodiode and optical power monitoring Autogain circuit 10' of the present invention which may be employed in the sample calibration mode calibration of the optical power delivered at the sample 25 and during the sample exposure mode. FIGS. 6A, 6B, 6C, and 6D–14A and 14B depict the Autogain circuit 10' or aspects of its operation in greater detail. The Auto gain circuit 10' will be described in terms of its structure and operation in the sample calibration mode and in the sample exposure mode which sequentially accompany one another in the exposure of a single sample 25.

As shown in FIGS. 6A, 6B, 6C, and 6D, in a multi-wavelength sensitometer, a single Autogain circuit 10' card input has a reed relay multiplexer 16 to select one of four input photodiodes 14 for selectively measuring the power levels of laser light sources 12 of four wavelengths. Photo energy from the selected laser 12 is changed to an analog output voltage in the photodiode and current-to-voltage converter (CVC) 11 configured as a transimpedance amplifier with selectable gain as described below in reference to FIGS. 6A, 6B, 6C, and 6D. The analog CVC output voltage is monitored by the voltage comparator and gate logic 13 and is also directly sent to the computer input/output circuit 21 via its analog input. The analog CVC output voltage is digitized in input/output circuit 21 and stored in a table in RAM in the computer 23 as the measured optical power level described above. The 16-bit ADC circuit in input/output circuit 21 is capable of resolving 65536 voltage levels of 152.6 µV in a range between the ADC's defined 10.0 V upper resolution limit and a 0.0 V lower resolution limit. The defined upper limit voltage level of 10.0 V and an arbitrary lower limit voltage level of 0.9 V yields the resolution of 1 part in 65535 parts at 10.0 V and 1 part in 5898 parts at the 0.9 volt lower limit. In accordance with the present invention, if the analog CVC output voltage is outside these limits, the gain of the transimpedance amplifier is adjusted automatically until the analog CVC output voltage is within these limits.

The upper limit is therefore defined by the actual upper resolution limit of the ADC, and the lower limit is defined by the desired minimum resolution of at least 1 part in 1000 parts. The lower limit also to some degree will determine the signal-to-noise ratio if the limit is set low. In the case of the earlier sensitometer of FIGS. 2A and 2B, the lower limit was 0.017 V, requiring 17 µV resolution to obtain the 1 part in 1000 parts resolution. The signal-to-noise ratio was low, and therefore many readings had to be averaged to obtain a reliable, noise free reading. The hardware (DVM) required 0.38 seconds to 0.75 seconds per reading to convert from analog to digital with the desired resolution. The normal reading rate of the earlier sensitometer is 0.3 readings per second, whereas the normal reading rate of the improved sensitometer system of FIGS. 4A and 4B of the present invention with the Autogain circuit 10' is 20,000 readings per second.

The combined increased reading rates (0.30 verses 20,000 per second) with the improved noise immunity (0.017 verses 0.900 V) increases the operating speed of the system of the present invention in that only single readings are required to obtain noise free power levels, and the 20,000 readings per second allows all 20 steps to be calibrated in less than 5 seconds as compared to the 20 to 30 minutes required in the earlier sensitometer to calibrate the 20 steps in the full scale calibration mode described above.

The speed of completing the gain adjustment allows the calibration of the sensitometer to be conducted prior to each sample exposure of a step wedge as described above. Prior to the exposure of each sample, each step of the step wedge is calibrated and the results stored in the exposure standard register 39 followed by the exposure of the product sample. The gain setting and the in-range digitized CVC output voltages are stored on the computer's hard drive for a finite time (days to weeks) or may be stored separately as an aid in the analysis of the exposed step wedge W of the product sample. This increases the reliability of the sensitometry process by calibrating to a standard for each step seconds before each sample step wedge is exposed.

The six stages of gain select NAND logic 17 are described below in conjunction with FIGS. 6A, 6B, 6C, and 6D and 11–14A and 14B and are briefly described as follows. Each stage selectively drives a reed relay primary coil that closes a reed switch in one of a set of six parallel feedback resistor and switch circuits of the adjustable resistance feedback network 22 of the transimpedance amplifier (shown in FIG. 11). The selected combination of the open and closed reed switches defines the resistance sum in the feedback network 22 and sets the gain of the transimpedance operational amplifier 18. A primary Autogain circuit function is to automatically select the total feedback resistance that provides the gain to drive the analog CVC output voltage within the range of the ADC.

In FIGS. 6A, 6B, 6C, and 6D, the NAND gates of the six gain stages are coupled in a feedback arrangement to all of the outputs of the six gain stages in a manner satisfying the logic tree of FIGS. 14A and 14B and the parallel resistance values of FIG. 12 described below. Upper limit and lower limit logic signals, i.e. >10.0 V and <0.9 V, are outputted from the voltage comparator and gate logic 13 and indicate when the analog output voltage is above 10.0 V or below 0.9 V. The >10.0 V upper limit signal is applied as an input to one NAND gate of each of the six stages and results in the setting of one the gain stages as described in greater detail below. The <0.9 V lower limit voltage signal is applied as an input to a further NAND gate of each of the six stages and results in clearing one of the gain stages. In other words, if a >10.0 V upper limit voltage signal is generated, a gain stage is set to insert a corresponding resistor 22 in parallel in the feedback path and reduce the total gain of CVC amplifier 11. If a <0.9 V lower limit signal is generated, a gain stage is cleared to remove a corresponding resistor 22 from a parallel connection in the feedback path to increase the total gain of transimpedance operational amplifier 18. The gain stages are set in stage sequence 1, 2, 3, 4, 5, and 6. The gain stages are cleared in stage sequence 6, 5, 4, 3, 2, and 1.

Discrete output signals from the six stages of gain select NAND logic 17 indicating the selected gain scale, are also provided to the computer input/output circuit 21. Gain select NAND logic 17 does not check for gain setting or clearing sequences that do not follow the above-stated sequences. The computer 23 checks for that error when it reads the digital gains applied to input/output circuit 21 from the gain select NAND logic 17.

Considering FIGS. 5 and 6A, 6B, 6C, and 6D together, edge sensing pulse generators and filter/delay logic 15 is also triggered on any gain change registered in the gain select NAND logic 17. Various timing pulses are derived on detection of an out of limit gain change which control operations of the voltage comparator and gate logic 13 and the computer 23 as described below. A "WAIT" period of at least 1.0 msec is generated at a gain scale change and applied to the computer input/output circuit 21 in order to signal the computer 23 when Autogain circuit 10' is busy. When the WAIT is removed, the computer 23 reads the digitized final voltage of the CVC amplifier in photodetector and operational amplifier 11. A shorter, 550 μsec "INHIBIT" period simultaneously times out and allows additional gain scale changes to be registered by the voltage comparator and gate logic 13. Each additional gain change re-triggers the WAIT signal and starts the WAIT period over. After all the necessary gain changes are made, the WAIT period issued by the pulse generators and filter/delay logic 15 times out and indicates "READY" to the computer input/output circuit 21.

When completed, the digitized output voltage of the photo detector and CVC 11 that is applied to the ADC circuit in the computer input/output 21 is between the low and upper limits (>0.9 V and <10.0 V). The computer 23 reads the digitized voltage from the ADC along with the digital Gains signal from the gain select NAND logic 17 and determines which gain stages are set and cleared, and if there is an gain error (out of sequence gain stages set or cleared). Then, with the proper gain determined, the computer 23 applies the calibration gain and coefficient (derived during the primary calibration and stored in the calibration reference table 41'), and the proper scale coefficient to end up with a power level within the range of 1 to 10,000,000.

Figure 7:
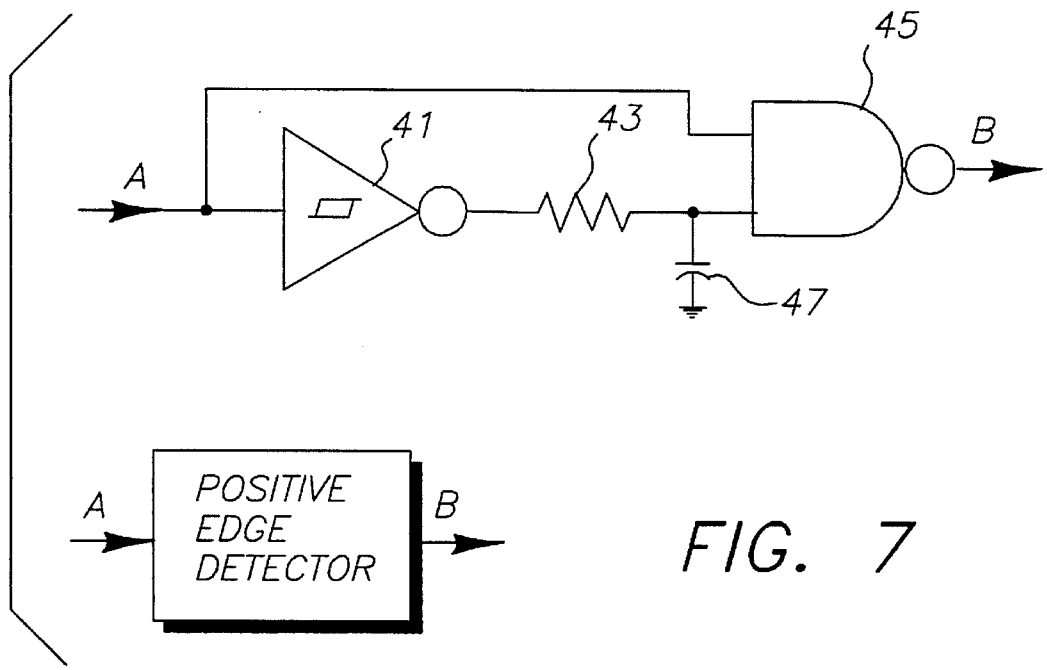
FIG. 7 is a detailed schematic of the positive edge detectors employed in the circuit of FIGS. 6A, 6B, 6C, and 6D.

FIGS. 6A, 6B, 6C, and 6D depicts a more detailed block diagram of the multiple gain, automatic ranging, optical power monitoring circuit 10' of the present invention in relation to the laser beam 31' and the computer input/output 21. A number of blocks are illustrated for filters, delays, and edge sensors in FIGS. 6A, 6B, 6C, and 6D. FIG. 7 depicts a typical positive edge detector circuit, FIG. 8 depicts a typical low pass filter/delay, and FIG. 9 is a timing diagram of signals appearing in these circuits employed in FIGS. 6A, 6B, 6C, and 6D.

The positive edge detector circuit of FIG. 7 comprises the signal invertor 41 having an input for input signal A and an output coupled through low pass resistor 43 and capacitor 47 to one input of NAND gate 45 generating an output signal B. A second input of NAND gate 45 is coupled to receive input signal A. In FIG. 9, the waveform of input signal A and positive edge detection output signal B are shown. If the positive input signal A is a pulse shorter than time T1, the output signal B will be a pulse having the same length. If the pulse of input signal A is wider than time T1, the output signal B pulse will be set to the width of T1.

Figure 8:
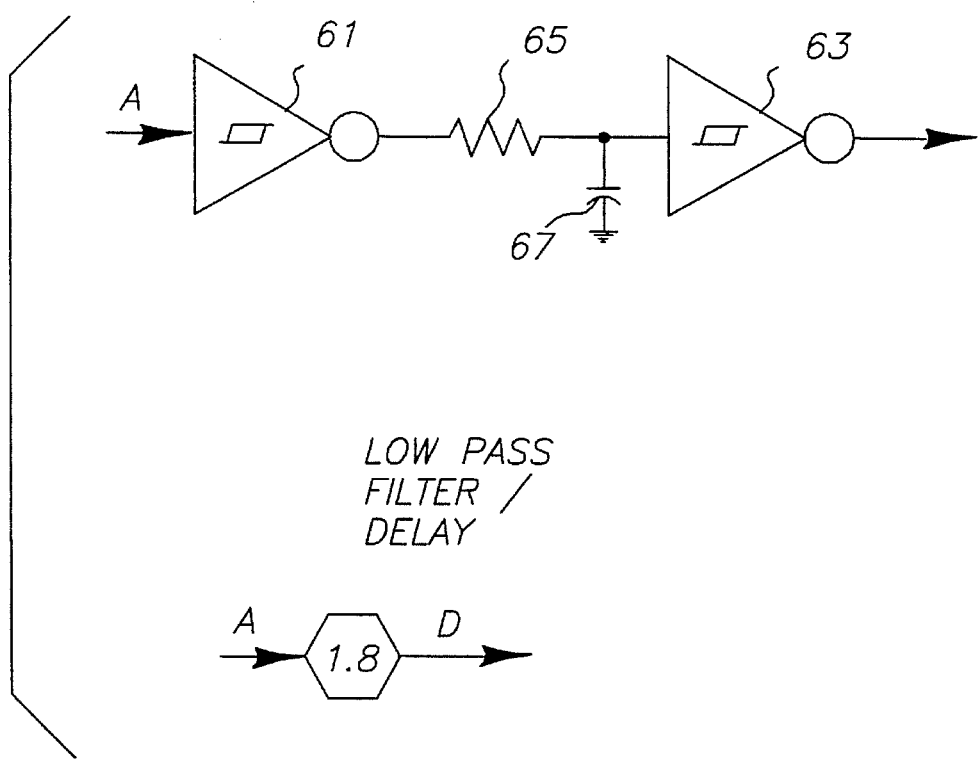
FIG. 8 is a detailed schematic of the pulse filter/delays employed in the circuit of FIG. 6A, 6B, 6C, and 6D.
Figure 9:
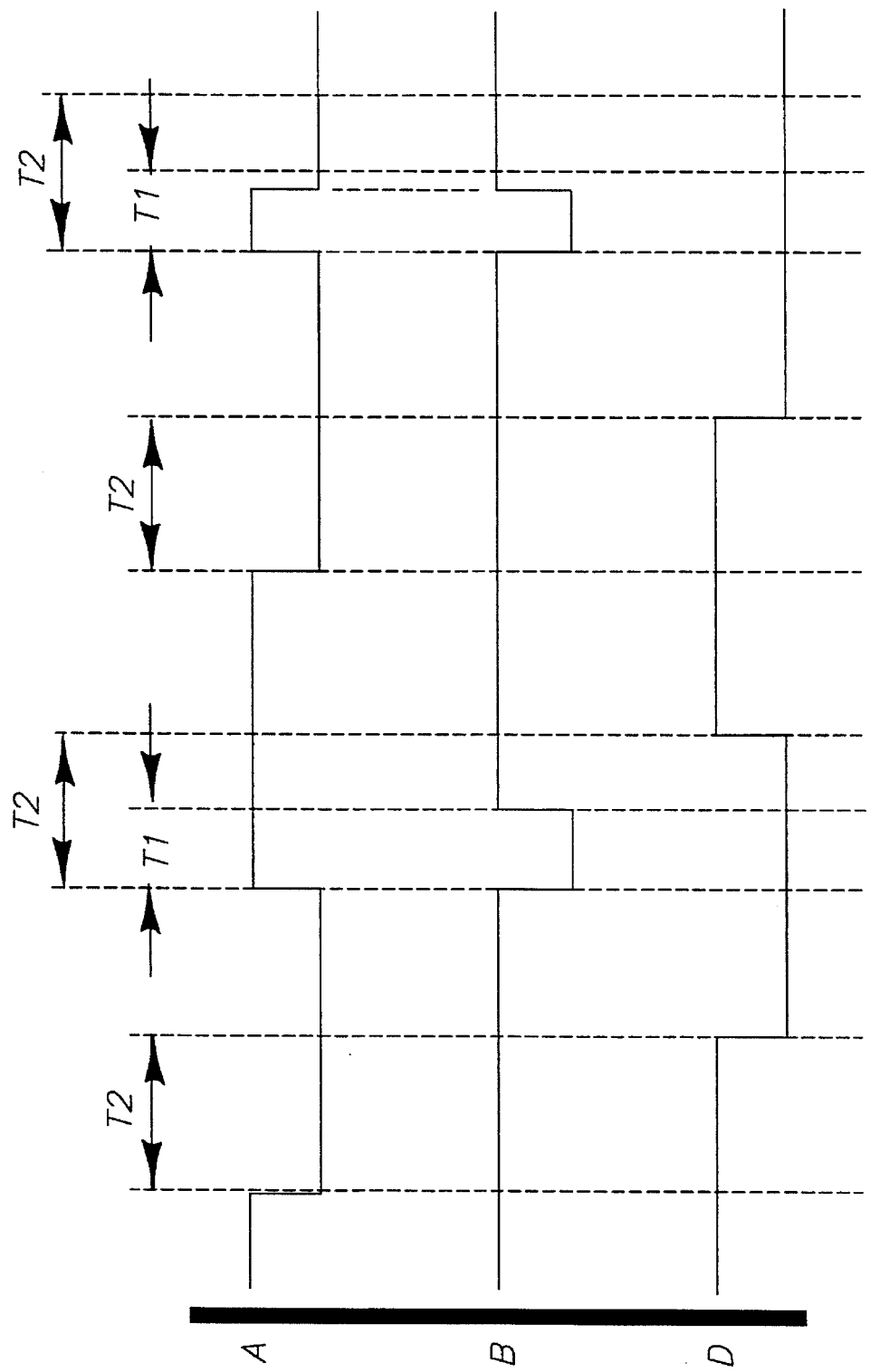
FIG. 9 is a timing diagram of the positive edge detectors and pulse filter/delays of FIGS. 7 and 8.

The low pass filter/delay circuit of FIG. 8 comprises a pair of inverters 61 and 63 separated by a low pass filter resistor 65 and capacitor 67 or simply the low pass filter resistor 65 and 67 with a single invertor 63, depending on the use. With input signal A as shown in FIG. 9, output signal D shows the delay T2 in response to an input signal pulse A that is longer than the time T2. As shown, when the input signal A is shorter than the time T2, the low pass filter/delay circuit does not respond. The input inverter 61 can be any TTL output but should drive only the resistor 65 and no additional circuits for best results.

Returning to FIGS. 6A, 6B, 6C, and 6D, the input MUX 16 selects the desired input photodiode 14 via the Channel Select output from the computer input/output 21. The input MUX 16 may be coupled to the outputs of a number of photodiodes 14 associated with different laser wavelengths which may be used within one single laser sensitometer. The wavelengths may be used at the same time or one at a time. When used together, the wavelengths are calibrated separately prior to exposure then measured as a whole (multiple wavelength), selecting multiple input channels at the same time during the actual exposure.

When the computer 23 issues a "New Channel" command through the computer input/output 21 on its Channel Select output, the input MUX 16 is operated to couple a further photodiode 14 into the Autogain circuit 10' and edge detector 74 triggers ON. The 1.0 msec scaling inhibit pulse generator 68 is triggered ON by the edge detected New Channel command applied through NOR gate 70 and operates as described below through OR gate logic 48 to trigger inhibit/comparator hysteresis reset 50 to operate as described below. The delay after a new channel is selected allows the transimpedance operational amplifier 18 time to settle before the scaling operation begins.

The optical energy from the diverted laser beam 31' is converted to analog photocurrent by the selected photodiode 14. The photocurrent is convened to an analog output voltage at the node 20 of the operational amplifier 18 and selected feedback resistors 22. This node voltage appears across the adjusted feedback resistor network 22, because the input to the operational amplifier 18 is at ground potential. The selection of the feedback resistance value is made by a gain change signal derived as described in greater detail below. The combination of operational amplifier 18 and selected feedback resistors 22 constitutes the CVC or transimpedance amplifier referred to in the discussion of the preferred embodiment of the present invention.

Figure 13:
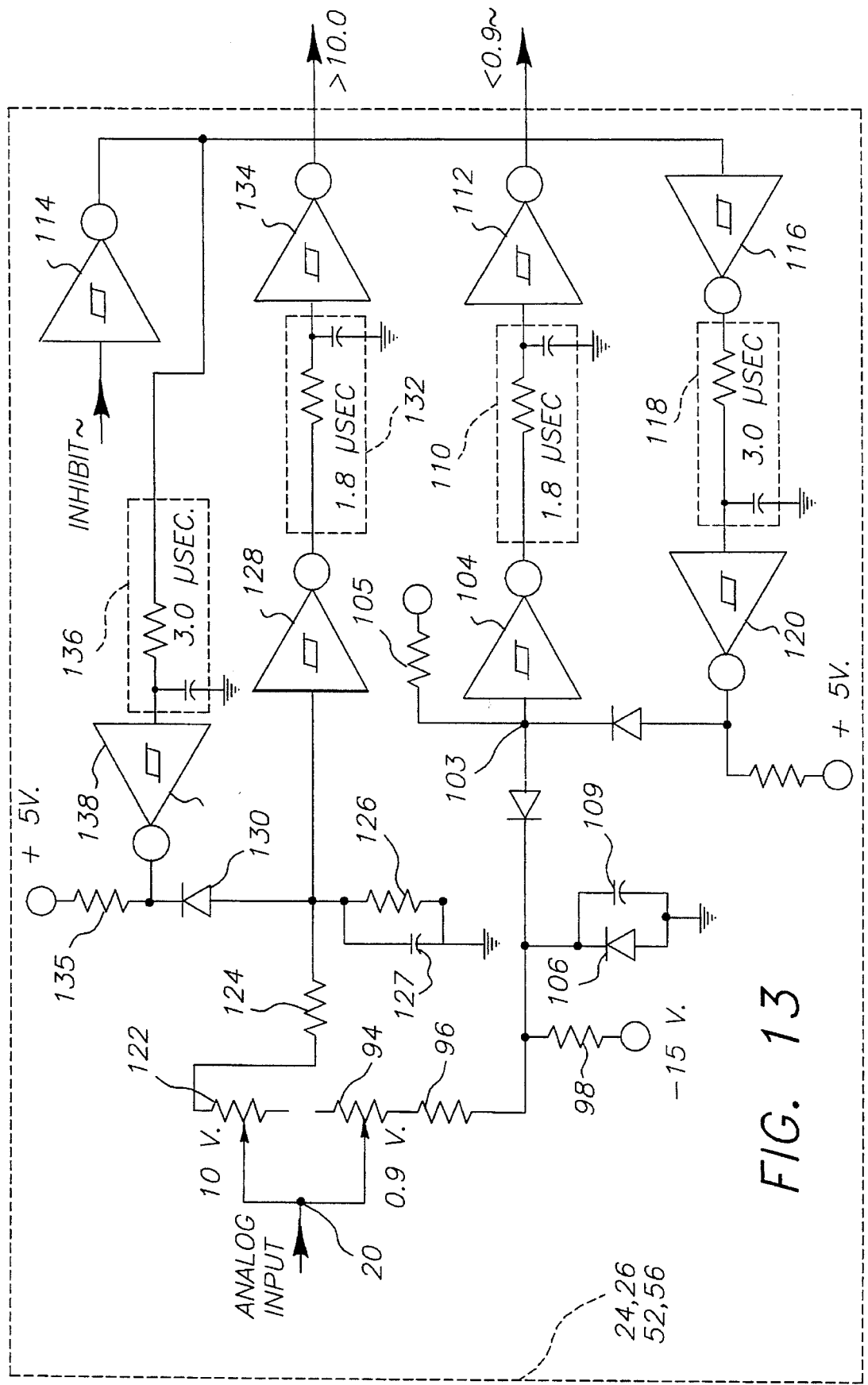
FIG. 13 is a detailed schematic diagram of the analog input stage voltage comparator of FIGS. 6A, 6B, 6C and 6D.

The analog CVC output voltage at the node 20 is fed to an analog input of the ADC in computer input/output circuit 21 and to the input of the digital logic voltage comparator 24 of the voltage comparator and gate logic 13 shown in greater detail in FIG. 13. If the analog CVC output voltage is >0.9 V and <10.0 V, the WAIT signal is removed and the output voltage is digitized in the 16-bit ADC in input/output circuit 21 and retrieved by computer 23, stored in memory and used in the calibration of the appropriate step power prior to the start of sample exposure of the 20 step wedge. If not, then it is necessary to change the gain provided by gain select NAND logic 17 such that the voltage does fall between the upper and lower limit. This process is also referred to as scale change. In this case there is a 10 X relationship between scales.

Figure 11:
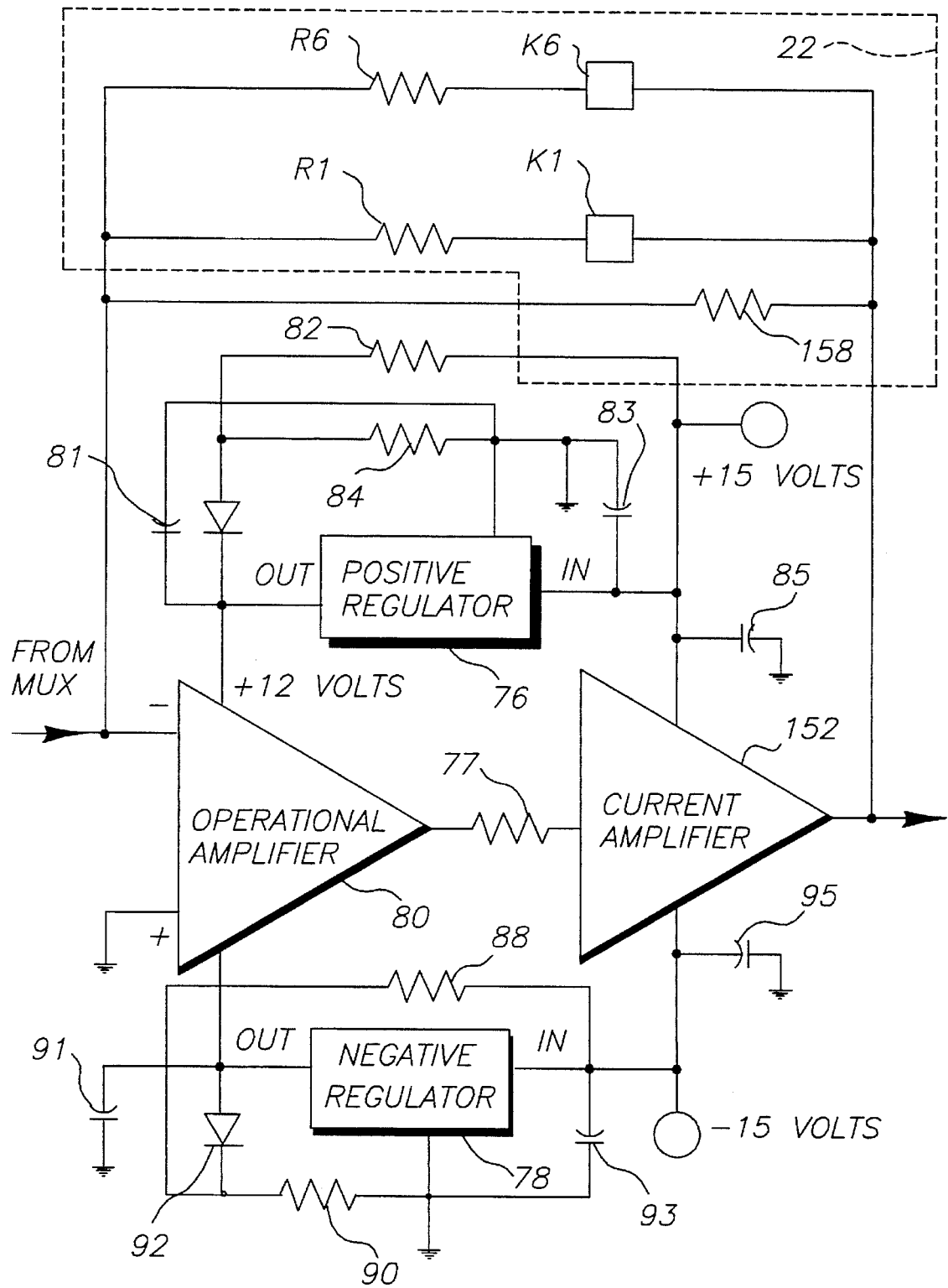
FIG. 11 is a detailed schematic diagram of the CVC amplifier employed in the circuit of FIGS. 6A, 6B, 6C, and 6D.

Turning now to FIG. 11, it depicts the operational amplifier 18 and feedback resistor network 22 in greater detail. The operational amplifier 18 is actually two series connected op amp 80 and a current amp 152 which supplies the current needed to drive the analog load. The feedback resistors 22 comprise a fixed 504 megohm feedback resistor 158 and six parallel feedback loops comprising network resistors $R_1$-$R_6$ and relay switches $K_1$-$K_6$. The combined resistance is determined by the closure of the switches $K_1$-$K_6$ which in turn is determined by which of the gain stage relays is energized by a set gain stage or de-energized by a cleared gain stage. The combinations of possible resistance values from the energized and de-energized relays is set forth in FIG. 12 and ranges from 504 ohms with all switches $K_1$-$K_6$ closed to 504 megohms with all of the switches opened. The op amp 80 and current amp 152 therefore have a corresponding gain range of 1:10,000,000.

In FIG. 11 a low power positive voltage regulator 76 and a low power negative voltage regulator 78, together with start-up circuits are connected between regulated voltage input terminals of the op amp 80 and +15.0 V and −15.0 V supplies. The positive and negative voltage regulators 76, 78 provide regulated +12.0 V and −12.0 V power to the op amp 80 so that op amp 80 is further isolated from the output voltage of current amp 152. The high gain of the op amp 80 requires the additional power supply isolation for feedback resistances as high as 504 megohms to eliminate feedback oscillations.

The positive voltage regulator 76 has an input terminal coupled to the +15 supply and an output terminal coupled to the positive supply terminal of op amp 80 and supplies a regulated +12.0 V thereto. A positive start-up circuit is provided comprising the resistor 84 and diode 86 coupled in series between a ground terminal and the output terminal and resistor 82 coupled between the +15 V supply and the junction of resistor 84 and diode 86. Capacitors 81, 83 and 85 provide bypass for high frequency noise from the power to ground. A negative start-up circuit is provided comprising the resistor 90 and diode 92 coupled in series between a ground terminal and the output terminal and resistor 88 coupled between the −15 V supply and the junction of resistor 90 and diode 92. Capacitors 91, 93 and 95 also provide bypass for high frequency noise from the power to ground.

The self start up circuit for the low power voltage regulators operates as follows. When the operational amplifier 80 is first powered up, one of the two supply voltage levels, +15.0 V or −15.0 V, comes up first (in terms of sub-micro seconds). The respective voltage regulator applies its output voltage to the supply lead of the op amp 80, and it reverse biases the output of the other voltage regulator through the supply leads of the op amp 80. When the second power level comes up, its respective low power regulator will not start up, because its output is being held at the opposite polarity.

For discussion, assume the −15.0 volt supply comes up first, and the positive start-up circuit of resistors 82 and 84 and diode 86 is not present. The negative voltage regulator 78 functions and delivers −12.0 V to the op amp 80. The non-infinite internal resistance of the op amp 80 allows the −12.0 V to partially couple to the output of the positive voltage regulator 76, which therefore does not start up when the +15.0 V supply comes up.

With the positive start-up circuit in place, the resistors 82 and 84 drop the +15.0 V to some level below the designed output of the positive low power regulator 76 yet still above ground, for example, +5.0 V. At the junction of resistors 82 and 84, the +5 V is fed to the output of the positive low power voltage regulator 76 through the forward biased diode 86, resulting in a voltage at the output of the voltage regulator 76 of about +4.3 V (5.0 V—the diode 86 forward biased voltage drop of 0.7 volt). With the output of positive voltage regulator 76 now prevented from being zero or negative, the positive voltage regulator 76 starts up. The +12.0 V output of the positive regulator 76 then reverse biases the diode 86 and disconnects the start-up circuit 82, 84. A similar process occurs if the positive regulator 76 starts up first, since the resistors 88 and 90 with diode 92 guarantee the start-up the negative voltage regulator 78. The positive and negative local voltage regulators 76 and 78 and the self start-up circuits provide an additional 30 db of noise isolation to the op amp 80 from the power supply and output current amp 152 which improves the signal-to-noise ratio.

Returning to FIGS. 6A, 6B, 6C, and 6D, the six stages of gain select NAND logic 17 are connected in such a way as to sequence gain changes to next higher or lower gain scale (next lower or higher total feedback resistance, respectively) from the current gain when one of the out of limit signals, <0.9 V or >10.0 V, generated by voltage comparator and gate logic 13 is "TRUE". The digital logic voltage comparator 24 effects the comparison of the CVC output voltage at node 20 to +10.0 V and +0.9 V reference voltages when it is not inhibited by edge sensing pulse generators and filter/delay logic 15 in a manner described below.

Referring now to FIG. 13, it depicts the digital logic voltage comparator 24 having a >10.0 V signal generating channel and a <0.9 V signal generating channel as well as the 1.8 μsec low pass filter/delays 26 and 56 and the 3.0 μsec low pass filter/delay 52 in detail. Digital Schmitt inverters 104 and 128 have a normally "LOW" and "HIGH" output signals or rest states, respectively, when an applied input signal at node 20 is between the <0.9 V and >10.0 V lower and upper limit levels, respectively, and/or when an applied INHIBIT signal is present. Digital Schmitt inverters 104 and 128 both have LOW output signals or states when an applied input signal at node 20 exceeds the >10.0 V upper limit. Digital Schmitt inverters 104 and 128 both have HIGH output signals or states when an applied input signal at node 20 falls below the <0.9 V lower limit.

The +0.9 V reference voltage for the <0.9 V channel is provided by the setting of adjustable resistor 94 which is part of a voltage divider network between ground +5.0 V and −15.0 V comprising resistors 94, 96, 98 and 105, capacitor 109 and diode 102. Resistor 107 is out of the network since diode 108 is reverse biased. Diode 106 is also reverse biased, and capacitor 109 bypasses high frequency or fast signal rise times to ground to reduce noise sensitivity. The voltage developed across resistor 105 is connected to the input of the inverter 104. The resistor 94 is adjusted so that an input voltage at node 20 of +0.9 V is divided by the resistors 94, 96, 98 and 105 such that the voltage across resistor 105 drops the +5.0 V connected to one side of resistor 105 until the voltage matches the negative voltage and current thresholds of the inverter 104 resulting in the generation of the LOW output "<0.9" of inverter 112. The inverter 104 negative voltage threshold ranges from +0.7 V to +1.1 V with +0.9 V typical.

The +10.0 V upper limit reference voltage for the >10.0 V channel is provided by the setting of adjustable resistor 122, which is part of a voltage divider to ground circuit made up of resistors 122, 124 and 126; with diode 130 reversed biased, resistor 135 is out of the circuit. Capacitor 127 bypasses high frequency or fast rise times to ground to reduce noise sensitivity. The voltage developed across resistor 126 is connected to the input of the inverter 128. The resistor 122 is adjusted so an input voltage of +10.0 V at node 20 is divided by the resistors 122, 124 and 126 so the voltage across resistor 126 matches the positive voltage threshold of the inverter 128 which then generates the HIGH signal ">10.0 V". The positive voltage threshold at the input of inverter 128 ranges from +1.5 V to +2.0 V with +1.7 V typical.

The output signals or states of the digital logic Schmitt trigger inverters 128 and 104 are applied to low pass filter and delay 132, 134 (corresponding to low pass filter and delay 56 of FIGS. 6A, 6B, 6C, and 6D) and low pass filter and delay 110, 112 (corresponding to low pass filter and delay 26 of FIGS. 6A, 6B, 6C, and 6D), respectively and are inverted thereby to provide the ">10.0" and "<0.9" outputs of FIG. 13, which are HIGH and LOW, respectively. A further inverter in the signal gate 28 (FIGS. 6A, 6B, 6C, and 6D) inverts the LOW <0.9 V signal level to HIGH, so that the NAND logic 58 of each of the six stages of the NAND gate logic 17 are capable of changing state and effecting a change in the states of the RS flip-flops of the next stage in a sequence described below. Similarly, the HIGH >10.0 V signal level renders the NAND logic 30 capable of changing state and effecting a change in the states of the RS flip-flops of the next stage in the opposite sequence described below. However, when the output signals or states of the digital logic Schmitt trigger inverters 128 and 104 are HIGH and LOW, respectively, then no gain change can take place.

The 550 µsec INHIBIT pulse prevents a gain scale change from taking place while it persists after a preceding gain change as follows. In FIGS. 6A, 6B, 6C, and 6D, the pulse generator 46 produces the 550 µsec INHIBIT pulse which is applied to the inhibit/comparator hysteresis reset 50 and applied through the 3.0 µsec low pass filter/delay 52 to the digital logic voltage comparator 24. In the FIG. 13 implementation, the components of 3.0 µsec low pass filter/delay 52 comprise the low pass filter 136 and inverter 138 for the >10.0 V channel and the low pass filter 118 and inverters 116 and 120 for the <0.9 V channel. The INHIBIT signal is simultaneously applied to the inputs of the inverter 116 and the low pass filter 136. The output signals generated at the outputs of the inverters 120 and 138 are applied to the inputs of the inverters 104 and 128 at nodes 103 and 101 through the diodes 108 and 130, respectively.

The INHIBIT signal when TRUE is a LOW state signal that is processed by inverting it in inverter 114 of inhibit/comparator hysteresis reset 50 to a HIGH state signal. After the 3.0 µsec delay afforded by low pass filter/delay 136, the HIGH signal is inverted LOW again by inverter 138 and forward biases diode 130. This LOW pulse overpowers the VT+ analog signal at the input node 101 of inverter 128 with a signal more negative than VT− for the 550 µsec INHIBIT time, causing inverter 128 to change to the rest state with a HIGH output. Assuming that a >10.0 V signal is being outputted from inverter 134 at the time that the INHIBIT pulse is generated, it goes LOW or FALSE 1.8 µsec after inverter 128 changes to the rest state through operation of the 1.8 µsec low pass filter/time delay 132. When the INHIBIT pulse terminates, the output of inverter 114 goes LOW, but the 3.0 µsec delay due to RC low pass filter 136 and inverter 138 holds the input node 101 LOW for this additional time. Then, the inverter 128 output goes HIGH or LOW dependent on the signal level prevailing at node 101.

With respect to the <0.9 V comparator channel, the processed INHIBIT pulse is delayed 3.0 µsec by the RC low pass filter/time delay 118 before being inverted to a HIGH state by inverter 120 (both forming part of 3.0 µsec low pass filter/delay 52) and finally forward biasing diode 108. This pulse overpowers the VT− analog signal at the input node 103 of inverter 104 with a signal more positive than VT+ for the 550 µsec INHIBIT time, causing inverter 104 to change to the rest state with a LOW output. The <0.9 V signal outputted from inverter 112 goes HIGH or FALSE 1.8 µsec (delay 110) after inverter 104 changes to the rest state. When the processed INHIBIT signal terminates, the output of inverter 116 goes LOW, but the 3.0 µsec delay due to RC low pass filter 118 and inverter 120 holds the input 103 HIGH for this additional time. Then, the inverter 104 output goes HIGH or LOW dependent on the signal level prevailing at node 103.

Turning now to the situation when the INHIBIT pulse is not present and the input CVC signal at node 20 is less than 0.9 volt, the analog input signal feeds through resistors 94 and 96 which connect to the bias resistor 98 at node 100. The junction voltage at node 100 is determined by the CVC voltage at node 20 and resistors 94, 96, and 98, diode 102, the IT− parameter (input bias current) of the invertor 104 and resistor 105 connected to +5.0 V. Diodes 106 and 102 limit the negative analog input voltage to near 0.0 V at the input node 103 of inverter 104. Capacitor 109 reduces the frequency response to obtain better noise immunity. Resistor 96 limits the adjustment range and provides current limiting if the analog input goes to +15.0 V or −15.0 V. Diode 108 is reverse biased by the voltage at input node 103 provided through resistor 105 and the output of inverter 120 making the diode 108 inactive at this time.

With a CVC voltage of +0.9 volt, the voltage at node 103 is 0.0 V to +0.4 V, nominally at +0.2 volt set by the nominal VT− parameter (the threshold voltage of inverter 104) of +0.9 volt minus the forward voltage drop of diode 102 (0.7 V). Therefore, when the voltage at node 20 is below +0.9 volt, the voltage at node 103 is nominally at +0.2 V to −0.7 volt (negative voltage is limited by diode 106 forward voltage drop), the input to inverter 104 is nominally at +0.9 volt to 0.0 volt, and the output of inverter 104 goes HIGH. The 1.8 µsec time delay set by the RC low pass filter 110 delays the start and end of the pulse by 1.8 µsec before it reaches the input of inverter 112. The <0.9 V out of limit signal output of inverter 112 goes LOW, is inverted in signal gate 28 to a HIGH or TRUE state, and is applied to the six stages of gain select NAND logic 17 as shown in FIGS. 6A, 6B, 6C, and 6D.

In the second case where the CVC input voltage at node 20 is +10.0 V, the analog CVC output voltage signal at node 20 is reflected through resistors 122, 124 and to the input node 101 and across the bias resistor 126 and capacitor 127. Due to the proper choice of resistor values, the voltage at the input node 101 of inverter 128 is then at VT+, where VT+ is specified at 1.4 to 2.0 V, with 1.7 V as typical. The inverter 128 input current is 0.0 amps at the positive threshold as established by the manufacture's specification. The diode 130 is reverse biased by the +5.0 V applied through resistor 135 from a source and does not affect the circuit at this time. The signal level at input NODE 101 causes the inverter 128 to provide a LOW output signal that is delayed and inverted at the output of inverter 134 to a HIGH, >10.0 V signal. This signal is inverted by a further inverter in signal gate 28 to provide a LOW or TRUE state and is applied to the six stages of gain select NAND logic 17 as shown in FIGS. 6A, 6B, 6C, and 6D.

It should be noted that the INHIBIT pulse is also generated by a Scaling Holdoff TRUE state generated by the computer 23 through computer input/output 21 in a manner described below, and that it has the same effect on digital logic voltage comparator 24 described above. The 3.0 µsec filter/delay 52 delays the INHIBIT pulse period and then inhibits the digital logic voltage comparator 24. The 3.0 µsec delay after the 550 µsec INHIBIT pulse generator 46 times out or the Scaling Inhibit TRUE state times out allows for timing deviations in the 1.8 µsec filter/delays 26 and 56.

Returning to FIGS. 6A, 6B, 6C, and 6D, therefore, if the CVC output voltage inputted to the digital logic voltage comparator 24 at node 20 is below the <0.9 V lower limit, the lower limit logic signal <0.9 V is TRUE at the output of signal gate 28. The TRUE lower limit logic signal is applied to each "lower input signal" NAND gates 30 of all six stages of the gains select NAND logic 17. As a result, a new TRUE output is generated in the next in sequence one of the NAND gates 30, and if the output is stable for longer than 1.8 µsec, it passes through the low pass filter/delay 32 of that stage and sets the next higher gain, RS flip-flop 34 of that gain stage. The state transition at the non-inverting or "Q" output of the flip-flop 34 is then fed back to the appropriate "input signal" NAND gate 58 or 30 (not both on the same gain stage) of all six stages and is fed through the positive edge detector 36 to the cumulative NOR logic 40 for all six stages. The signal passing through the NOR logic 40 starts the 550 µsec INHIBIT pulse generator 46 and the 1.0 msec WAIT pulse generator 42. The state transition at the inverting or "not-Q" output of the flip-flop 34 is also fed back to the appropriate "input signal" NAND gate 58 or 30 (not both on the same gain stage) of all six stages.

Similarly, if the analog CVC output voltage at node 20 is above +10.0 V, the high limit logic signal >10.0 V is TRUE at the output of signal gate 28. If the TRUE high limit logic signal is stable for longer than 1.8 µsec, it will be applied to the "high input signal" NAND gates 58 of all six stages of the gains select NAND logic 17. As a result, a TRUE output is generated from the next in sequence, one of the gains NAND gates 58, and if it is stable for longer than 1.8 µsec, it passes through the low pass filter/delay 60 and the NOR logic 62 of that stage and resets the next higher gain, RS flip-flop 34 of that stage. The state transition at the inverting or "not-Q" output of the flip-flop 34 is then fed back to the appropriate "input signal" NAND gate 58 or 30 (not both on the same gain stage) of all six stages and is fed through the positive edge detector 38 to the cumulative NOR logic 40 for all six stages. The signal passing through the NOR logic 40 starts the 550 µsec INHIBIT pulse generator 46 and the 1.0 msec WAIT pulse generator 42. The state transition at the non-inverting or "Q" output of the flip-flop 34 is also fed back to the appropriate "input signal" NAND gate 58 or 30 (not both on the same gain stage) of all six stages.

The "not-Q" output of each flip-flop 34 of each stage is also coupled to the gain change logic 54 which includes the relay driver and coil for that stage for operating one of the relay switches K1–K6 of FIG. 11. In addition, the "not-Q" output of flip-flop 34 of each stage is also coupled to the Gains parallel input terminal of the computer input/output circuit 21. The computer 23 can poll the Gains inputs of all six stages and determine the gain setting after the WAIT period is timed out.

A power-up reset 177 is provided to reset all of the RS flip-flops 34 of all six stages through the NOR logic 62 of each stage on system power up. In addition, the computer 23 may generates a Reset signal applied through computer input/output circuit 21 and NOR logic 62 of all stages. This reset would be used to try a fresh logic start over in case of an error has been detected by the computer when reading the gains. In each case, all relay drivers for relay switches $K_1$-$K_6$ in gain change logic 54 are energized so that all feedback resistors $R_1$-$R_6$ of FIG. 11 are connected in parallel to set the total gain of the operational amplifier 18 to its lowest level as shown in FIG. 12 at power up or reset.

Figure 10:
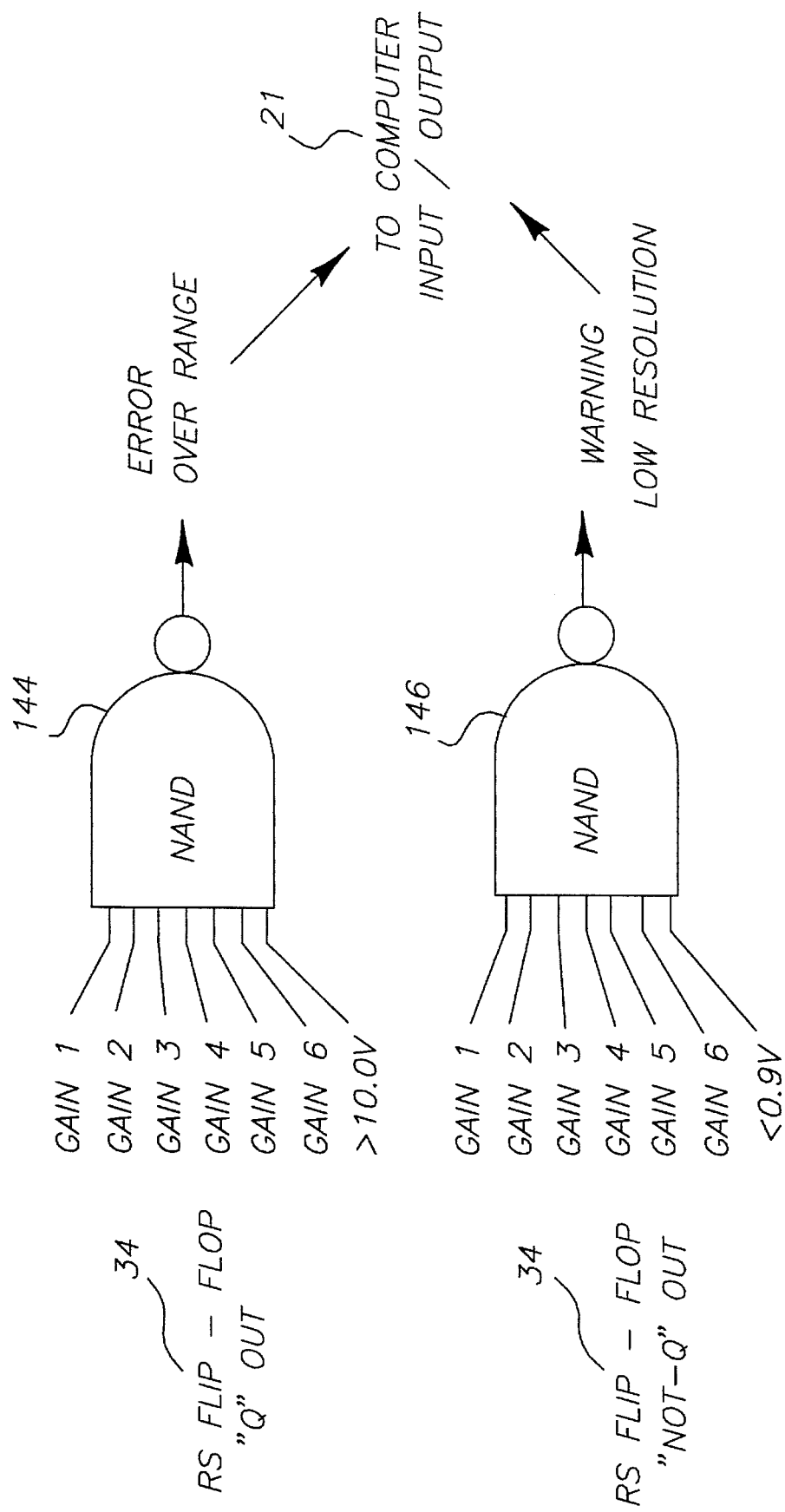
FIG. 10 is the detailed representation of the errors and warnings detected by the Auto gain circuit of the present invention.
Figure 14A:
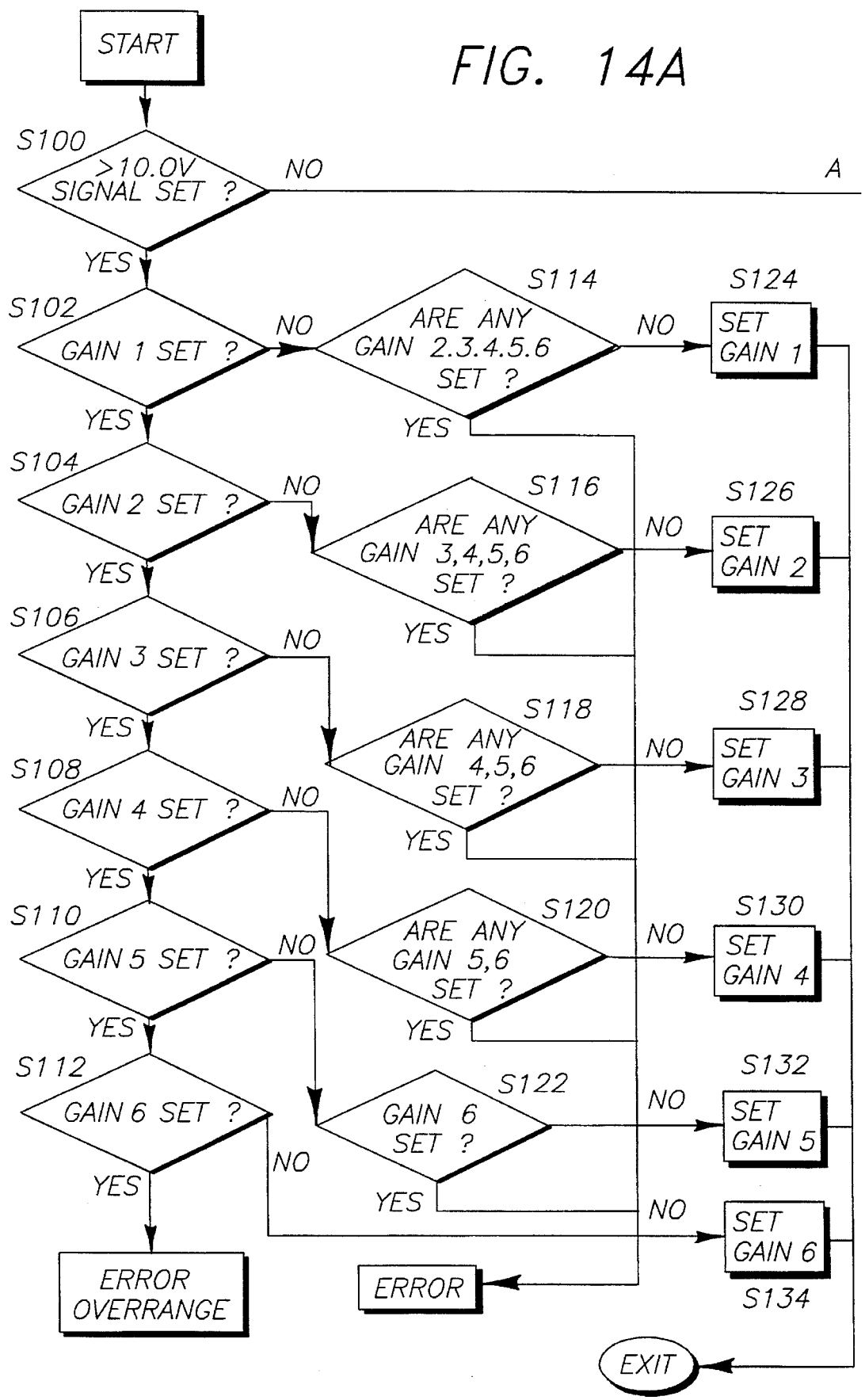
FIGS. 14A and 14B combined is a ladder tree flow chart divided to show the gain switching network of the circuit of FIGS. 6A, 6B, 6C, and 6D.
Figure 14B:
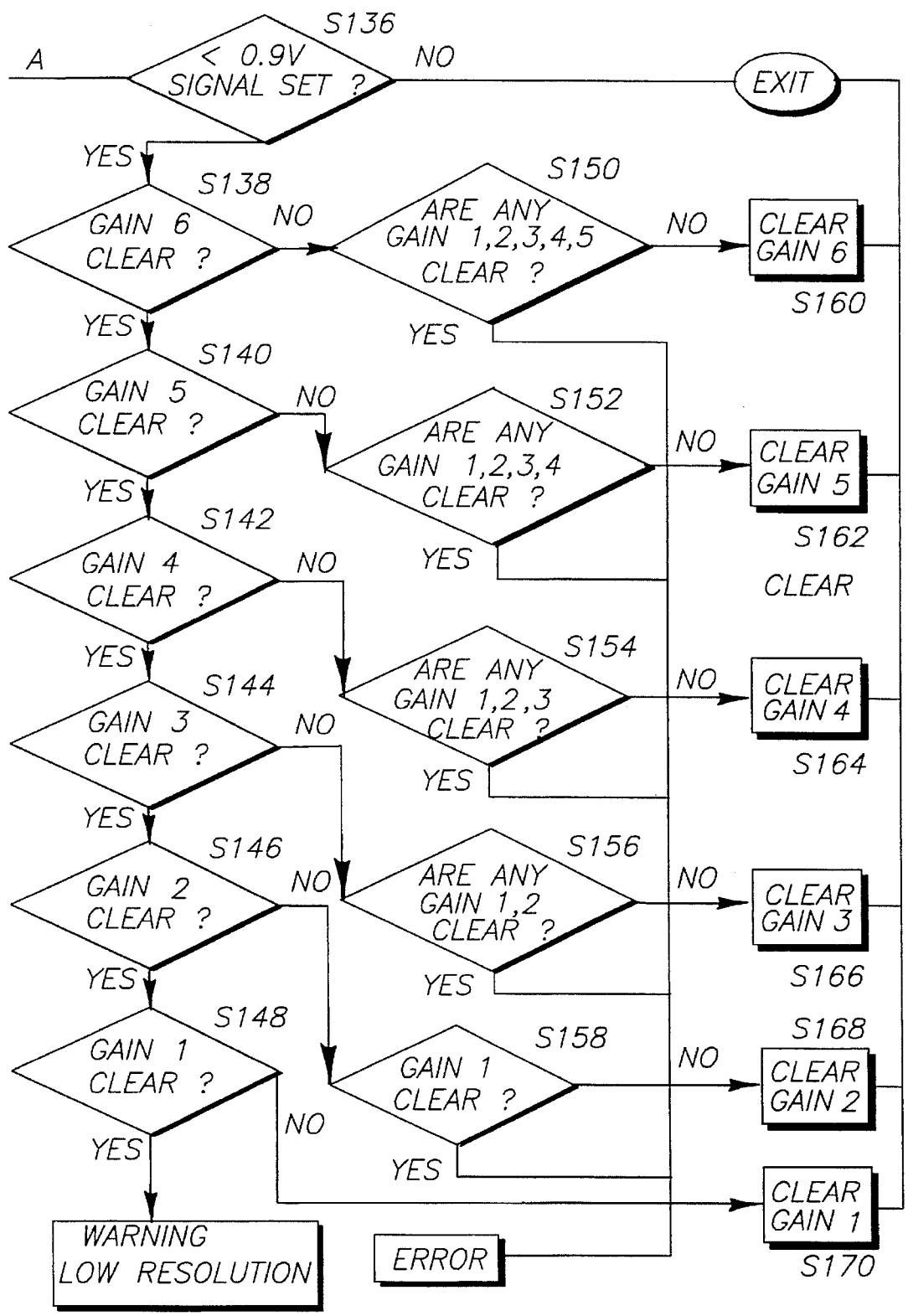

The gains NAND logic network of all of the gain stages is charted in the logic tree of FIGS. 14A and 14B. The "ERROR Over Range" and "WARNING Low Resolution" logic NAND gates 144 and 146 are coupled to all of the Q and not-Q outputs of flip-flops 34 as shown in FIG. 10. A gain stage is "set" if its flip-flop 34 is reset and its relay is energized to close the corresponding one of the relay contacts $K_1$-$K_6$ and to insert the corresponding resistor $R_1$-$R_6$ into the feedback path for the operational amplifier 18. A gain stage is "cleared" if its flip-flop 34 is set and its relay is de-energized to open the corresponding one of the relay contacts $K_1$-$K_6$ and to keep the corresponding resistor $R_1$-$R_6$ out of the feedback path for the operational amplifier 18. (The relay insulation resistance must be much higher than 100 gigaohms to reduce unwanted parallel resistance's in the feedback loop.)

From the START box, and if the >10.0 V or ">TEN" limit signal is TRUE at step S100, travel the left path of the tree testing each gain in sequence through steps S102–S112. If all gains are set, the power is over the range of the circuit and the "ERROR Over Range" digital signal is generated by an over range NAND gate 144 (FIG. 10) and supplied to computer 23 through computer input/output 21 to indicate a signal at CVC 20 that is too great to be resolved at the lowest gain setting by the ADC circuit in input/output 21. The over range NAND gate 144 input terminals are coupled to all six "Q" outputs of the flip-flops 34 and to the >10.0 V limit signal, and goes LOW when all inputs are HIGH. At the point in steps S100–S110 where a gain is not set, then the corresponding step among steps S114–S122 is followed. If the response to that step, or step S112, is "NO", then the corresponding gain is set in accordance with steps S124–S134. If the response to that step is "YES", then a further sequencing error has occurred that computer 23 determines from the Gains inputs to the computer input/output 21.

If the <0.9 V or "<PNINE" limit signal is TRUE in steps S100 and S136, travel the fight path testing each gain in sequence through steps S138–S148. If all gains are cleared, the power is under the range of the circuit, and the "WARNING Low Resolution" digital signal is generated by a further NAND gate 146 (FIG. 10) and applied to computer 23 through the computer input/output 21 to indicate a voltage at node 20 that cannot be resolved by the ADC at the highest gain setting. The low resolution NAND gate 146 input terminals are coupled to all six "not-Q" outputs of the flip-flops 34 and to the <0.9 V limit signal, and goes LOW when all inputs are HIGH. At the point in steps S138–S146 where a gain is not cleared, then the corresponding step among steps S150–S158 is followed. If the response to that step, or step S148, is "NO", then the corresponding gain is cleared in accordance with steps S160–S170. If the response to that step is "YES", then a further sequencing error has occurred that computer 23 determines from the Gains inputs to computer input/output 21.

The Autogain circuit 10' is also employed in a power monitoring role during the sample exposure of the step wedge W on a sample 25. The timing and control operations of the edge sensing pulse generators and filter/delay logic 15 (FIGS. 6A, 6B, 6C, and 6D) provide the overall timing for the operations of changing the gain so that the CVC signal level at node 20 is within the upper and lower limits during the monitoring of the power levels. As described above with respect to the sensitometer system of FIGS. 4A and 4B, during the sample exposure, the deflected laser light beam 31' is directed to the photodiode 14 and the optical power level is measured by the Autogain circuit 10' operating as described above in the sample calibration mode. The measured optical power levels and the gain scale settings for each step are stored in a trace file for the sample in the computer hard disk. At transitions between steps and during the blank unexposed bands of the step wedge W of FIG. 1, the monitoring function of the Autogain circuit 10' is momentarily interrupted by the Scaling Holdoff signal from the computer 23 in a manner described as follows.

To commence the exposure of the step wedge W on the sample 25 as depicted in FIG. 1, the start fiducial SF is exposed as described above with respect to FIGS. 4A and 4B while using the calibrated AOM drive codes. In this process, the AOM 27 is set fully ON, and the shutter 35 is opened for the appropriate number of scan lines to expose the start fiducial SF. Upon completion, the AOM 27 is turned OFF, and shutter 35 is closed to create the unexposed narrow band between the start fiducial SF and the 1st band, resulting from the advancement of the sample 25 in the advance direction A by the linear stage 43'.

At the proper position of the sample 25, the AOM 27 is powered by the calibrated AOM drive code to expose the 1st step, and the shutter 35 is opened to commence the exposure. At each step change, the laser light beam 31 power is changed to the next step calibrated AOM drive code applied by computer 23 to the AOM 27. If the AOM 27 is out of range to obtain the next lower power level, one or two of the flip-in neutral filters 59 are placed into the laser light beam 31 as required to obtain the proper step exposure power as found in the preceding calibration.

In order to clearly distinguish or set off the 11th step exposure in the step wedge W of FIG. 1, unexposed white gaps or spaces are created on either side. The AOM 27 is powered OFF and shutter 35 is closed, to create the unexposed white space just prior to step 11 of step wedge W, and the Scaling Holdoff signal is generated. The blank lines providing the width of the space are counted from the scanner control 51' as the sample 25 is advanced by stage 43'. At a certain count, the step 11 power is applied to the AOM 27, the shutter 35 is opened, the Scaling Holdoff signal is removed by the computer 23 and output 21 and the WAIT signal switches to READY, starting the step 11 exposure. The process is repeated at the end of the last written line of step 11.

The remaining steps 11–20 are exposed through the end of the last written line of step 20. The AOM 27 is powered OFF, any neutral density flip-in filters 59 are flipped out of the beam, and the shutter 35 is closed to create the white space at the end of step 20 in the same manner as described above. The AOM 27 is then powered fully ON, the shutter 35 is opened, and the exposure of the ending fiducial(s) EF is effected.

At the transitions between steps 10 and 11 and between steps 11 and 12 resulting in the unexposed white gaps, the Scaling Holdoff signal is applied from the computer 23 through computer input/output 21 to the low pass filter/delay 66 as shown in FIGS. 6A, 6B, 6C, and 6D. The following description explains how the Autogain circuit 10' responds in both cases to generate the READY/WAIT signals and to effect any necessary gain scale changes within the short time periods that allow for a sample calibration to be conducted with each sample step wedge exposure.

If the Scaling Holdoff signal remains TRUE for 1.8 μsec, the low pass filter/delay 66 sends a WAIT signal via NOR logic gate 44 to the computer's READY/WAIT input which persists as long as the Scaling Holdoff signal remains true and for an extension time period described below. The Scaling Holdoff TRUE signal is also fed via the OR logic 48 and the inhibit/comparator hysteresis logic circuit 50 as an INHIBIT pulse to the signal gate 28 which persists as long as the Scaling Holdoff TRUE signal is generated by computer 23. This INHIBIT pulse disables the signal gate 28 from passing the logic limit signals, >10.0 V and <0.9 V to the gains NAND gates 58 and 30, respectively, as described above. The 3.0 μsec low pass filter/delay 52 also delays and transmits this INHIBIT pulse to the digital logic voltage comparator 24 and resets the hysteresis of the inverters in voltage comparator 24 in the same fashion as the 550 μsec INHIBIT pulse described above with respect to FIG. 13. The INHIBIT pulse therefore disables the automatic gain scaling operation while the computer 23 changes the AOM drive codes or the target optical power levels and the resulting laser beam 31 power level to be monitored by Autogain circuit 10' during the sample exposure mode or the sample calibration mode, respectively.

In order to make gain scale changes, if necessary, upon detecting an out of limit condition at node 20, further INHIBIT pulse time delays and WAIT signals are generated by the 550 μsec inhibit pulse generator 46 and the 1.0 msec wait pulse generator 42. If, when the INHIBIT pulse generator 46 times out, the analog CVC output voltage at node 20 is still below the lower limit <0.9 V or above the upper limit >10.0 V, another cycle as described above occurs which selects the next higher or lower gain, resulting in restarting of the INHIBIT pulse time delays and WAIT signals. These gain scale change cycles continue until analog CVC output voltage at node 20 is between the upper and lower limits. The WAIT pulse generator 42 then times out and indicates READY to the computer input/output 21 through NOR logic gate 44.

When the computer 23 is finished changing the AOM drive code or the target optical power level and the resulting laser beam power level, computer 23 switches the input/output 21 Scaling Holdoff signal FALSE. The transition is passed through the NOR logic gate 70 and triggers the 1.0 msec scaling INHIBIT pulse generated by scaling inhibit pulse generator 68. The 1.0 msec scaling INHIBIT pulse provides an extension time period of the WAIT signal as it is transmitted via an 18 μsec pulse stretcher 72 and NOR logic gate 44 to the READY/WAIT input of computer input/output 21. The pulse stretcher 72 holds the WAIT signal TRUE for 18 μsec after the 1.0 msec INHIBIT pulse generated by the scaling inhibit pulse generator 68 times out to allow gain scale changes to occur if required. The 1.0 msec INHIBIT pulse generated by pulse generator 68 is also fed via the OR logic 48 to the inhibit/comparator hysteresis reset 50. The INHIBIT pulse period applied to the digital logic voltage comparator 24 and the signal gate 28 as a result of the TRUE Scaling Holdoff signal is therefore prolonged by 1.0 msec.

Turning to the speed of operation of the Autogain circuit 10', if the voltage at node 20 is within the upper limit and the lower limit, then 569.8 μsec after the Scaling Holdoff signal is set FALSE by the computer 21, the READY signal goes TRUE. The 569.8 μsec delay is made up of the time delays comprising the 1.8 μsec from filter/delay 66, the 550 μsec from scaling inhibit pulse generator 68, and the 18 μsec from pulse stretcher 72. Then, optical power readings can be made at the full ADC conversion rate, in this case, 20,000 readings per second.

If the power level resident on the photodiode 14 requires a single gain scale change, then 1558.4 μsec after the Scaling Holdoff signal is set FALSE by the computer 21, the READY signal goes TRUE. This delay comprises the 1.8 μsec from filter/delay 66, 550 μsec from the scaling pulse generator 68, 3.0 μsec from filter/delay 52, 1.8 82 sec from filter/delays 26 or 56, 1.8 μsec from filter/delays 32 or 60, and 1000 μsec from the wait pulse generator 42. Power readings can therefore be made at the rate of 641 readings per second with a 10:1 power change present between each reading.

If the power level resident on the selected photodiode 14 requires two or more gain scale changes, then when the Scaling Holdoff signal is set FALSE for a total time period equal to 1558.4 μsec plus the number of scales changed times 556.6 μsec. In a worst case situation with a 1,000,000:1 power change between each reading, power readings can still be made at minimum rate of 204 readings per second.

Stated another way, the Autogain circuit operation is fast, requiring only one half millisecond per decade gain change plus an additional ten milliseconds for analog circuit settling time. A 10:1 scale change range thus takes eleven milliseconds, a 100:1 range takes twelve milliseconds, etc. Corresponding sampling speeds run from ninety-one readings per second with a 10:1 power change to sixty-two readings per second with 10,000,000:1 power change between each sample point. Without a gain change, the reading rate is twenty thousand per second, which is the analog to digital conversion sampling rate.

The Autogain circuit does not require a computer to select the gains that it operates at. However, the computer 23 is necessary to store the digitized values of the voltage output and the associated gain scale for each reading at the resulting gain setting.

The lower limit of 0.900 V gives good noise immunity and good resolution with a 16-bit ADC which has 152.588 82 V per bit resolution. The 0.900 volt lower limit is thereby resolved to ±0.000152588 V resolution which works out to be 5898 ADC counts, providing a full three and one half digits of resolution.

While there has been shown what are considered to be the preferred embodiments of the invention, it will be manifest that many changes and modifications may be made therein without departing from the essential spirit of the invention. It is intended, therefore, in the following claims to cover all such changes and modifications as may fall within the true scope of the invention.

We claim:

1. A gain control system of a current-to-voltage converter responsive to an input current signal for providing an output voltage signal within analog-to-digital conversion upper and lower limits to an analog-to-digital converter for digitizing said output voltage signal comprising:

operational amplifier means having a current input terminal and an analog voltage output terminal and an adjustable resistance feedback network coupled between said current input terminal and said analog voltage output terminal for defining a plurality of gain scales between a maximum gain and a minimum gain depending on the adjusted feedback resistance forming said current-to-voltage converter;

means for establishing an analog-to-digital conversion upper limit voltage level;

means for establishing an analog-to-digital conversion lower limit voltage level;

upper limit comparing means for comparing the output voltage signal of said current-to-voltage converter to said analog-to-digital conversion upper limit voltage level and providing an upper out of limit signal in response thereto;

lower limit comparing means for comparing the analog output voltage signal of said current-to-voltage converter to said analog-to-digital conversion lower limit voltage level and providing a lower out of limit signal in response thereto;

gain scale logic means having a plurality of gain select logic stages for increasing said adjusted feedback resistance in response to an upper out of limit signal and for decreasing said adjusted feedback resistance in response to a lower out of limit signal to an adjusted gain scale between said maximum gain and said minimum gain effecting an output voltage signal level between the analog-to-digital conversion upper and lower limit voltage levels;

means for providing a digitized output signal of said analog output voltage signal from said analog-to-digital converter after said adjusted gain scale is established by said gain scale logic means;

means for storing said adjusted gain scale and said digitized output signal.

2. The gain control system of claim 1 further comprising:

means for providing an over range error signal in response to an upper out of limit signal generated at the minimum gain set by said gain scale logic means; and means for providing a low resolution error signal in response to a lower out of limit signal generated at the maximum gain set by said gain scale logic means.

3. The gain control system of claim 1 wherein:

said adjustable resistance feedback network comprises a plurality of feedback resistors and bistable switches capable of being switched between a closed or an open state coupled in parallel across said input terminal and said output terminal, whereby the adjusted feedback resistance is determined by the closed and open states of the plurality of switches; and said plurality of gain select logic stages each comprise a bistable flip-flop having first and second inputs and outputs switchable between first and second states, an increasing gain logic gate having a plurality of gate inputs and a gate output coupled to said first input, a decreasing gain logic gate having a plurality of gate inputs and a gate output coupled to said second input, and means responsive to the first state of said flip-flop for effecting closure of a respective one of said plurality of bistable switches to decrease said adjusted feedback resistance and to increase gain of said operational amplifier means and responsive to the second state of said flip-flop for effecting opening of one of said plurality of bistable switches to increase said adjusted feedback resistance and to decrease gain of said operational amplifier means.

4. The gain control system of claim 3 further comprising:

an adjustable gain gate logic ladder network for applying said lower out of limit signal to one gate input of all of said plurality of increasing gain gate logic inputs and said upper out of limit signal to one gate input of all of said plurality of decreasing gain gate logic inputs and for interconnecting the remaining gate inputs of said increasing gain and decreasing gain logic gate inputs with outputs of selected ones of said plurality of flip-flops in a ladder network arranged to increase the total number of flip-flops switched to the first state in response to an upper out of limit signal in a first predetermined sequence and arranged to decrease the total number of flip-flops switched to the first state in response to a lower out of limit signal in a second predetermined sequence.

5. The gain control system of claim 4 further comprising:

means coupled to said ladder network for providing an over range error signal in response to an upper out of limit signal generated at the minimum gain set by said gain scale logic means; and means coupled to said ladder network for providing a low resolution error signal in response to a lower out of limit signal generated at the maximum gain set by said gain scale logic means.

6. The gain control system of claim 5 further comprising:

means coupled to said ladder network for providing a sequencing error signal in response to an increase in the total number of flip-flops switched to the first state that does not follow said first predetermined sequence and to a decrease in the total number of flip-flops switched to the first state that does not follow said second predetermined sequence.

7. The gain control system of claim 4 further comprising:

means coupled to said ladder network for providing a sequencing error signal in response to an increase in the total number of flip-flops switched to the first state that does not follow said first predetermined sequence and to a decrease in the total number of flip-flops switched to the first state that does not follow said second predetermined sequence.

8. In a system for rapidly measuring the intensity of a light beam modulated in intensity over a range of intensities in response to an applied intensity defining signal of the type comprising:

a light beam source for providing a light beam in a light beam path;

a register containing a set of digital intensity defining signals;

means for modulating the intensity of the light beam in said light beam path in response to an applied digital intensity defining signal;

means for selectively retrieving said digital intensity defining signals and applying the retrieved intensity defining signal to said modulating means;

means in said light beam path for providing a current signal having a current level dependent on the intensity of the light beam;

current-to-voltage conversion means for converting said current signal to an analog voltage output signal having a voltage amplitude level; and analog-to-digital conversion means for converting analog voltage output signals having voltage amplitude output levels within analog-to-digital conversion upper and lower limits defining a predetermined conversion range between a maximum voltage level and a minimum voltage level to digital output signals;

the improvement in a gain control system of said current-to-voltage converter for providing an output voltage signal within said analog-to-digital conversion upper limit and lower limit further comprising:

operational amplifier means having a current input terminal and an analog voltage output terminal and an adjustable resistance feedback network coupled between said current input terminal and said analog voltage output terminal for defining a plurality of gain scales between a maximum gain and a minimum gain depending on the adjusted feedback resistance;

means for establishing an analog-to-digital conversion upper limit voltage level;

means for establishing an analog-to-digital conversion lower limit voltage level;

upper limit comparing means for comparing the output voltage signal of said current-to-voltage converter to said analog-to-digital conversion upper limit voltage level and providing an upper out of limit signal in response thereto;

lower limit comparing means for comparing the analog output voltage signal of said current-to-voltage converter to said analog-to-digital conversion lower limit voltage level and providing a lower out of limit signal in response thereto;

gain scale logic means having a plurality of gain select logic stages for increasing said adjusted feedback resistance in response to an upper out of limit signal and for decreasing said adjusted feedback resistance in response to a lower out of limit signal to an adjusted gain scale between said maximum gain and said minimum gain effecting an output voltage signal level between the analog-to-digital conversion upper and lower limit voltage levels;

means for providing a digitized output signal of said analog output voltage signal from said analog-to-digital conversion means after said adjusted gain scale is established by said gain scale logic means; and means for storing said adjusted gain scale and said digitized output signal.

9. The system of claim 8 further comprising:

means for providing an over range error signal in response to an upper out of limit signal generated at the minimum gain set by said gain scale logic means; and means for providing a low resolution error signal in response to a lower out of limit signal generated at the maximum gain set by said gain scale logic means.

10. The system of claim 8 wherein:

said adjustable resistance feedback network comprises a plurality of feedback resistors and bistable switches capable of being switched between a closed or an open state coupled in parallel across said input terminal and said output terminal, whereby the adjusted feedback resistance is determined by the closed and open states of the plurality of switches; and said plurality of gain select logic stages each comprise a bistable flip-flop having first and second inputs and outputs switchable between first and second states, an increasing gain logic gate having a plurality of gate inputs and a gate output coupled to said first input, a decreasing gain logic gate having a plurality of gate inputs and a gate output coupled to said second input, and means responsive to the first state of said flip-flop for effecting closure of a respective one of said plurality of bistable switches to decrease said adjusted feedback resistance and to increase gain of said operational amplifier means and responsive to the second state of said flip-flop for effecting opening of one of said plurality of bistable switches to increase said adjusted feedback resistance and to decrease gain of said operational amplifier means.

11. The system of claim 10 further comprising:

an adjustable gain gate logic ladder network for applying said lower out of limit signal to one gate input of all of said plurality of increasing gain gate logic inputs and said upper out of limit signal to one gate input of all of said plurality of decreasing gain gate logic inputs and for interconnecting the remaining gate inputs of said increasing gain and decreasing gain logic gate inputs with outputs of selected ones of said plurality of flip-flops in a ladder network arranged to increase the total number of flip-flops switched to the first state in response to an upper out of limit signal in a first predetermined sequence and arranged to decrease the total number of flip-flops switched to the first state in response to a lower out of limit signal in a second predetermined sequence.

12. The system of claim 11 further comprising:

means coupled to said ladder network for providing an over range error signal in response to an upper out of limit signal generated at the minimum gain set by said gain scale logic means; and means coupled to said ladder network for providing a low resolution error signal in response to a lower out of limit signal generated at the maximum gain set by said gain scale logic means.

13. The system of claim 12 further comprising:

means coupled to said ladder network for providing a sequencing error signal in response to an increase in the total number of flip-flops switched to the first state that does not follow said first predetermined sequence and to a decrease in the total number of flip-flops switched to the first state that does not follow said second predetermined sequence.

14. The system of claim 11 further comprising:

means coupled to said ladder network for providing a sequencing error signal in response to an increase in the total number of flip-flops switched to the first state that does not follow said first predetermined sequence and to a decrease in the total number of flip-flops switched to the first state that does not follow said second predetermined sequence.

15. A system for calibrating a sensitometer employed in exposing a step wedge of n density exposure steps on a photosensitive sample with n intensities of light comprising:

means for supporting said sample;

a light beam source for providing a light beam in a light beam path directed to said sample;

means for scanning said light beam in line scans of a predetermined length onto said sample;

means for effecting relative movement of said supporting means with respect to said scanning means for exposing successive line scans of said sample in each density exposure step;

a register containing a set of n digital intensity defining signals;

means for modulating the intensity of the light beam in said light beam path in response to an applied digital intensity defining signal;

means for selectively retrieving said n digital intensity defining signals and applying the retrieved intensity defining signal to said modulating means;

means in said light beam path for providing a current signal having a current level dependent on the intensity of the light beam;

current-to-voltage conversion means for converting said current signal to an analog voltage output signal having a voltage amplitude level; and analog-to-digital conversion means for converting analog voltage output signals having voltage amplitude output levels within analog-to-digital conversion upper and lower limits defining a predetermined conversion range between a maximum voltage level and a minimum voltage level to digital output signals;

the improvement in a gain control system of said current-to-voltage converter for providing an output voltage signal within said analog-to-digital conversion upper limit and lower limit during a calibration of said light beam intensity further comprising:

operational amplifier means having a current input terminal and an analog voltage output terminal and an adjustable resistance feedback network coupled between said current input terminal and said analog voltage output terminal for defining a plurality of gain scales between a maximum gain and a minimum gain depending on the adjusted feedback resistance;

means for establishing an analog-to-digital conversion upper limit voltage level;

means for establishing an analog-to-digital conversion lower limit voltage level;

upper limit comparing means for comparing the output voltage signal of said current-to-voltage converter to said analog-to-digital conversion upper limit voltage level and providing an upper out of limit signal in response thereto;

lower limit comparing means for comparing the analog output voltage signal of said current-to-voltage converter to said analog-to-digital conversion lower limit voltage level and providing a lower out of limit signal in response thereto;

gain scale logic means having a plurality of gain select logic stages for increasing said adjusted feedback resistance in response to an upper out of limit signal and for decreasing said adjusted feedback resistance in response to a lower out of limit signal to an adjusted gain scale between said maximum gain and said minimum gain effecting an output voltage signal level between the analog-to-digital conversion upper and lower limit voltage levels;

means for providing a digitized output signal of said analog output voltage signal from said analog-to-digital conversion means after said adjusted gain scale is established by said gain scale logic means; and means for storing said adjusted gain scale and said digitized output signal.

16. The system of claim 15 further comprising:

means for providing an over range error signal in response to an upper out of limit signal generated at the minimum gain set by said gain scale logic means; and means for providing a low resolution error signal in response to a lower out of limit signal generated at the maximum gain set by said gain scale logic means.

17. The system of claim 15 wherein:

said adjustable resistance feedback network comprises a plurality of feedback resistors and bistable switches capable of being switched between a closed or an open state coupled in parallel across said input terminal and said output terminal, whereby the adjusted feedback resistance is determined by the closed and open states of the plurality of switches; and said plurality of gain select logic stages each comprise a bistable flip-flop having first and second inputs and outputs switchable between first and second states, an increasing gain logic gate having a plurality of gate inputs and a gate output coupled to said first input, a decreasing gain logic gate having a plurality of gate inputs and a gate output coupled to said second input, and means responsive to the first state of said flip-flop for effecting closure of a respective one of said plurality of bistable switches to decrease said adjusted feedback resistance and to increase gain of said operational amplifier means and responsive to the second state of said flip-flop for effecting opening of one of said plurality of bistable switches to increase said adjusted feedback resistance and to decrease gain of said operational amplifier means.

18. The system of claim 17 further comprising:

an adjustable gain gate logic ladder network for applying said lower out of limit signal to one gate input of all of said plurality of increasing gain gate logic inputs and said upper out of limit signal to one gate input of all of said plurality of decreasing gain gate logic inputs and for interconnecting the remaining gate inputs of said increasing gain and decreasing gain logic gate inputs with outputs of selected ones of said plurality of flip-flops in a ladder network arranged to increase the total number of flip-flops switched to the first state in response to an upper out of limit signal in a first predetermined sequence and arranged to decrease the total number of flip-flops switched to the first state in response to a lower out of limit signal in a second predetermined sequence.

19. The system of claim 18 further comprising:

means coupled to said ladder network for providing an over range error signal in response to an upper out of limit signal generated at the minimum gain set by said gain scale logic means; and means coupled to said ladder network for providing a low resolution error signal in response to a lower out of limit signal generated at the maximum gain set by said gain scale logic means.

20. The system of claim 19 further comprising:

means coupled to said ladder network for providing a sequencing error signal in response to an increase in the total number of flip-flops switched to the first state that does not follow said first predetermined sequence and to a decrease in the total number of flip-flops switched to the first state that does not follow said second predetermined sequence.

21. The system of claim 18 further comprising:

means coupled to said ladder network for providing a sequencing error signal in response to an increase in the total number of flip-flops switched to the first state that does not follow said first predetermined sequence and to a decrease in the total number of flip-flops switched to the first state that does not follow said second predetermined sequence.

* * * * *

UNITED STATES PATENT AND TRADEMARK OFFICE
CERTIFICATE OF CORRECTION

PATENT NO. : 5,610,709
DATED : March 11, 1997
INVENTOR(S) : Lee O. Arrington, et al It is certified that error appears in the above-indentified patent and that said Letters Patent is hereby corrected as shown below:

| | |
|---|---|
| Column 29, line 34, | replace "convening" with -- converting --. |
| Column 31, line 44 | replace "convening" with -- converting --. |
| Column 31, line 47 | replace "convening" with -- converting --. |

Signed and Sealed this

Eighth Day of July, 1997

*Attest:*

BRUCE LEHMAN

*Attesting Officer*      *Commissioner of Patents and Trademarks*